(12) United States Patent
Chen et al.

(10) Patent No.: US 9,906,768 B2
(45) Date of Patent: Feb. 27, 2018

(54) USE OF A DEPTH CONDITION IN 3DV CODEC

(71) Applicant: QUALCOMM Incorporated, San Diego, CA (US)

(72) Inventors: Ying Chen, San Diego, CA (US); Jewon Kang, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 14/340,394

(22) Filed: Jul. 24, 2014

(65) Prior Publication Data

US 2015/0030087 A1    Jan. 29, 2015

Related U.S. Application Data

(60) Provisional application No. 61/859,143, filed on Jul. 26, 2013.

(51) Int. Cl.
*H04N 13/00* (2006.01)
*H04N 19/597* (2014.01)
*H04N 19/52* (2014.01)
*H04N 19/70* (2014.01)
*H04N 19/46* (2014.01)
*H04N 19/44* (2014.01)
*H04N 19/56* (2014.01)

(52) U.S. Cl.
CPC ......... *H04N 13/0048* (2013.01); *H04N 19/44* (2014.11); *H04N 19/46* (2014.11); *H04N 19/52* (2014.11); *H04N 19/56* (2014.11); *H04N 19/597* (2014.11); *H04N 19/70* (2014.11)

(58) Field of Classification Search
CPC .... H04N 13/0048; H04N 19/44; H04N 19/46; H04N 19/52; H04N 19/56; H04N 19/597; H04N 19/70
See application file for complete search history.

(56) References Cited

U.S. PATENT DOCUMENTS

2003/0202592 A1* 10/2003 Sohn .................... H04N 19/597
375/240.16
2010/0284466 A1* 11/2010 Pandit .................. H04N 19/597
375/240.16

(Continued)

OTHER PUBLICATIONS

Wiegand et al., "WD1: Working Draft 1 of High-Efficiency Video Coding," JCTVC-C403, 3rd Meeting: Guangzhou, CN, Oct. 7-15, 2010, 137 pp.

(Continued)

*Primary Examiner* — Anner N Holder
(74) *Attorney, Agent, or Firm* — Shumaker & Sieffert, P.A.

(57) ABSTRACT

In general, the disclosure relates to encoding and decoding a block of video data associated with three-dimensional (3D) video. A video coding device determines whether a depth condition associated with the block of video data should be set to valid within a coded bitstream. When the depth condition should be set to valid, the video coding device sets the depth condition to valid and encodes the block of video data using at least one camera parameter. The video coding device then determines whether the depth condition is valid. When the depth condition is valid, the video coding device decodes the block of video data using at least one camera parameter.

22 Claims, 11 Drawing Sheets

(56) References Cited

U.S. PATENT DOCUMENTS

| | | | | |
|---|---|---|---|---|
| 2011/0058017 | A1* | 3/2011 | Lee | H04N 19/507 348/43 |
| 2012/0229602 | A1* | 9/2012 | Chen | H04N 19/597 348/43 |
| 2012/0262547 | A1* | 10/2012 | Lee | H04N 13/0066 348/43 |
| 2013/0182760 | A1* | 7/2013 | Sasai | H04N 19/70 375/240.02 |
| 2013/0188013 | A1* | 7/2013 | Chen | H04N 19/597 348/43 |
| 2013/0194384 | A1* | 8/2013 | Hannuksela | H04N 19/597 348/43 |
| 2013/0287093 | A1* | 10/2013 | Hannuksela | H04N 19/00769 375/240.02 |
| 2015/0222912 | A1* | 8/2015 | Chuang | H04N 19/463 375/240.12 |
| 2015/0365694 | A1* | 12/2015 | Lin | H04N 19/597 375/240.16 |
| 2016/0029040 | A1* | 1/2016 | Deng | H04N 13/0048 375/240.16 |
| 2016/0057453 | A1* | 2/2016 | Chang | H04N 19/597 375/240.12 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_J7, 261 pp.

Bross et al., "High Efficiency VCoding (HEVC) text specification draft 9," 11th Meeting: Shanghai, CN, Oct. 10-19, 2012, JCTVC-K1003_v7, 290 pp.

Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

"Text of ISO/IEC 14496-10:2012/PDAM 2 MVC extension for inclusion of depth maps", MPEG Meeting, May 2012; Geneva, CH, Motion Picture Expert Group or ISO/IEC JTC1/SC29/WG11, No. N12731, XP030019204, 44 pp.

Chang et al., "AHG 15: Camera parameter signaling and depth reference selection," JCT-3V Meeting; Jul. 27-Aug. 2, 2013; Vienna, AT; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0163, XP030131191, 10 pp.

Chang et al.,"3D-HEVC HLS: Camera parameter signaling and Depth reference selection," JCT-3V Meeting; Apr. 20-26, 2013; Incheon, KR; (The Joint Collaborative Team on 3D Video Coding Extension Development of ISO/IEC JTC1/SC29/WG11 and ITU-T SG.16); No. JCT3v-D0140, XP030130804, 10 pp.

Chen et al., "Description of 3D Video Coding Techology Proposal by Qualcomm Incorporated," M22583, MPEG of ISO/IEC/JTC1/SC29/WG11, Geneva, CH, Nov. 2011, 21 pp.

Chen et al., "Signalling of camera parameters in 3D-HEVC," JCT-3V Meeting; Jul. 27-Aug. 2, 2013; Vienna, AT; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0134, XP030131153, 4 pp.

Hannuksela et al., "3D-AVC Draft Text 6," JCT-3V Meeting; Jan. 17-23, 2013; Incheon, KR; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D1002, XP030130980, 57 pp.

Schwarz et al,, "Description of 3D Video Technology Proposal by Fraunhofer HHI (HEVC compatible, configuration B)," MPEG Meeting; Nov. 2011; Geneva, CH; (Motion Picture Expert Group or ISO/IEC JTC1/SC29/WG11), No. m22571, XP030051134; 46 pp.

Hannuksela et al., "3D-AVC Draft Text 5," JCT3V-C1002, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013; 82 pp.

Su et al.; "3DV-CE1.a: Block-based View Synthesis Prediction for 3DV-ATM," JCT3V-A0107; Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 5 pp.

Tech et al., "3D-HEVC Test Model 4," JCT-3V Meeting: Incheon, KR; (The Joint Collaborative Team on 3D Video Coding Extension Development of ISO/IEC JTC1/SC29/WG11 and ITU-T SG.16), No. JCT3V-D1005-spec-V1, Apr. 20-26, 2013, XP030130998, 88 pp.

Jung et al., "CE2.h related: reduced candidates of NBDV," JCT-3V Meeting; Jul. 27-Aug. 2, 2013; Vienna, AT; (The Joint Collaborative Team on 3D Video Coding Extension Development of ISO/IEC JTC1/SC29/WG11 and ITU-T SG.16 ); URL: http://phenix.int-evry,fr/jct2/, No. JCT3V-E0190, XP030131227, 4 pp.

Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 18-26, 2013, which a Sep. 30, 2013, is available from http://phenix.int-evry.fr/jct/doc_end_user/documents/13_1ncheon/wg11/JCTVCM0432-v3.zip, 310 pp [uploaded in parts].

Zhang et al., "CE2.h related: Derived disparity vector for 3D-HEVC," JCT-3V Meeting, Apr. 20-26, 2013, Incheon, KR; (The Joint Collaborative Team on 3D Video Coding Extension Development of ISO/IEC JTC1/SC29/WG11 and ITU-T SG.16 ), URL: http://phenix.int-evry.fr/jct2/, No. JCT3V-D0194, Apr. 20-26, 2013; XP030130858, 4 pp.

Zhang et al,. "CE2.h: Derived disparity vector for 3D-HEVC," Vienna, AT; (The Joint Collaborative Team on 3D Video Coding Extension Development of ISO/IEC JTC1/SC29/WG11 and ITU-T SG.16); Document: JCT3V-E0125, Jul. 27-Aug. 2; 2013; 4 pp.

Zhao et al., "CE7: MB-level NBDV for 3D-AVC," Vienna, AT; (The Joint Collaborative Team on 3D Video Coding Extension Development of ISO/IEC JTC1/SC29/WG11 and ITU-T SG.16); Document: JCT3V-E0136, Jul. 27-Aug. 2, 2013, 10 pp.

(56) References Cited

OTHER PUBLICATIONS

Lee et al., "3D-CE7 related: Depth-based motion vector prediction in texture-first coding," Vienna, AT; (The Joint Collaborative Team on 3D Video Coding Extension Development of ISO/IEC JTC1/SC29/WG11 and ITU-T SG.16); Document: JCT3V-E0148, Jul. 27-Aug. 2, 2013, 4 pp.

International Search Report and Written Opinion from International Application No. PCT/US2014/048243, dated Sep. 30, 2014; 15 pp.

Response to Written Opinion dated Sep. 30, 2014, from International Application No. PCT/US2014/048243, filed on May 19, 2015, 7 pp.

Second Written Opinion from International Application No. PCT/US2014/048243, dated Jun. 18, 2015; 11 pp.

Response to Second Written Opinion dated Jun. 18, 2015, from International Application No. PCT/US2014/048243, filed on Aug. 18, 2015, 8 pp.

International Preliminary Report on Patentability from International Application No. PCT/US2014/048243, dated Oct. 9, 2015, 11 pp.

\* cited by examiner

USE OF A DEPTH CONDITION IN 3DV CODEC

This application claims the benefit of U.S. Provisional Application No. 61/859,143, filed Jul. 26, 2013, the entirety of which is incorporated herein.

TECHNICAL FIELD

This disclosure relates to video coding and compression, and more specifically, coding techniques that may be used in coding three-dimensional (3D) video.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

A multi-view coding bitstream may be generated by encoding views, e.g., from multiple perspectives. Multi-view coding may allow a decoder to choose between different views, or possibly render multiple views. Moreover, some three-dimensional (3D) video techniques and standards that have been developed, or are under development, make use of multiview coding aspects. Three dimensional video is also referred to as "3DV."

For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

Currently, a Joint Collaboration Team on 3D Video Coding (JCT-3C) of VCEG and MPEG is developing a 3D video standard based on the emerging standard referred to as "high efficiency video coding (HEVC)," for which part of the standardization efforts includes the standardization of the multiview video codec based on HEVC (MV-HEVC) and another part for 3D Video coding based on HEVC (3D-HEVC). For 3D-HEVC, a variety of coding tools, including those in coding unit/prediction unit level, for both texture and depth views may be included and supported.

SUMMARY

In general, the disclosure relates to encoding and decoding a block of video data associated with three-dimensional (3D) video. A video coding device determines whether a depth condition associated with the block of video data should be set to valid within a coded bitstream. When the depth condition should be set to valid, the video coding device sets the depth condition to valid and encodes the block of video data using at least one camera parameter. The video coding device then determines whether the depth condition is valid. When the depth condition is valid, the video coding device decodes the block of video data using at least one camera parameter.

In one example, the disclosure is directed to a method for decoding a block of video data associated with 3D video. According to this method, a video coding device determines whether a depth condition associated with the block of video data is valid. When the depth condition is valid, the video coding device decodes the block of video data using at least one camera parameter.

In another example, the disclosure is directed to a video coding device, such as a video decoder, for decoding a block of video data associated with 3D video. The video coding device may comprise a memory configured to store the block of video data. The video coding device may further comprise one or more processors in communication with the memory and configured to determine whether a depth condition is valid. When the depth condition associated with the block of video data is valid, the video coding device decodes the block of video data using at least one camera parameter.

In another example, the disclosure is directed to a computer-readable storage medium having instructions stored thereon that, when executed, configure a video coding device, such as a video decoder, to determine whether the depth condition associated with the block of video data is valid. When the depth condition is valid, the instructions may configure the video decoder to decode the block of video data using at least one camera parameter.

In another example, the disclosure is directed to an apparatus for decoding a block of video data associated with 3D video. The apparatus comprises means for determining whether a depth condition associated with the block of video data is valid. The apparatus further comprises means for decoding the block of video data using at least one camera parameter when the depth condition is valid.

In another example, the disclosure is directed to a method for encoding a block of video data associated with 3D video. According to this method, a video coding device determines whether a depth condition associated with the block of video data should be set to valid within a coded bitstream. When the depth condition should be set to valid, the video coding device sets the depth condition to valid and encodes the block of video data using at least one camera parameter.

In another example, the disclosure is directed to a video coding device, such as a video encoder, for encoding a block of video data associated with 3D video. The video coding device may be configured to determine whether a depth condition associated with the block of video data should be set to valid within a coded bitstream. When the depth condition should be set to valid, the video coding device sets the depth condition to valid and encodes the block of video data using at least one camera parameter.

In another example, the disclosure is directed to a computer-readable storage medium having instructions stored thereon that, when executed, configure a video coding device, such as a video encoder for encoding a block of video data associated with 3D video, to determine whether a depth condition associated with the block of video data should be set to valid within a coded bitstream. When the depth condition should be set to valid, the instructions may configure the video encoder to set the depth condition to valid and encode the block of video data using at least one camera parameter.

In another example, the disclosure is directed to an apparatus for encoding a block of video data associated with 3D video. The apparatus comprises means for determining whether a depth condition associated with the block of video data should be set to valid within a coded bitstream. The apparatus further comprises means for setting the depth condition to valid and encoding the block of video data using at least one camera parameter when the depth condition should be set to valid.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes techniques for deriving a default disparity vector in a three-dimensional video (3DV) codec, e.g., a video encoder and/or decoder that supports 3D coding. More specifically, various techniques related to default disparity vectors are proposed. Default disparity vectors may be used for inter-view motion prediction of blocks in a depth view. Default disparity vectors may also be used for interview motion prediction or inter-view residual prediction of blocks in a texture view. Some H.264/MVC and HEVC techniques that may relate to this disclosure are firstly reviewed, although this review should not be construed as any admission of prior art.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In H.264/AVC, each inter Macroblock (MB) may be partitioned into four different ways: One 16×16 MB partition, two 16×8 MB partitions, two 8×16 MB partitions, and four 8×8 MB partitions. Different MB partitions in one MB may have different reference index values for each direction (i.e., RefPicList0 or RefPicList1). When a MB is not partitioned into four 8×8 MB partitions, it may have only one motion vector for the whole MB partition in each direction.

When a MB is partitioned into four 8×8 MB partitions, each 8×8 MB partition can be further partitioned into sub-blocks. There are four different ways to get sub-blocks from an 8×8 MB partition: One 8×8 sub-block, two 8×4 sub-blocks, two 4×8 sub-blocks, and four 4×4 sub-blocks. Each sub-block can have a different motion vector in each direction. When an 8×8 MB partition is partitioned into sub-clocks, the resulting partitions are named sub-block partition.

Figure 1:
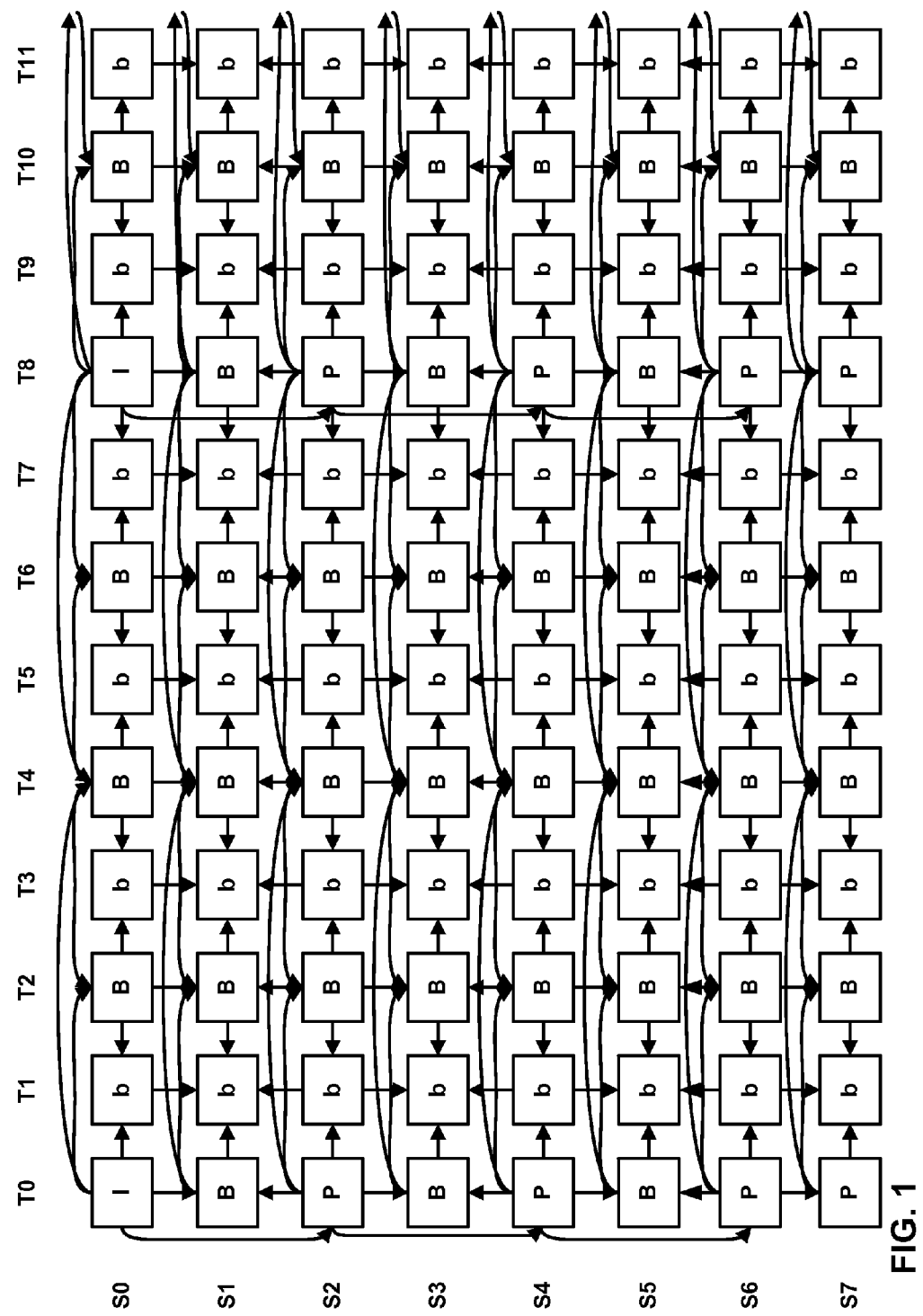
FIG. 1 is a diagram showing an MVC prediction structure for multi-view coding, which may be used as an example MVC temporal and inter-view prediction structure.

Multiview video coding (MVC) is an extension of H.264/AVC. The MVC specification is briefly discussed herein, although this discussion should not be construed as an admission of prior art. A typical MVC prediction (including both inter-picture prediction within each view and inter-view prediction) structure for multi-view video coding is shown in FIG. 1, where predictions are indicated by arrows, the pointed-to object using the point-from object for prediction reference. In particular, FIG. 1 shows an example MVC temporal and inter-view prediction structure.

In MVC, inter-view prediction is performed among pictures captured in the different views of the same access unit (i.e., with the same time instance) to remove correlation between views. A picture coded with inter-view prediction may be added into a reference picture list for the inter-view prediction of the other non-base views.

An inter-view prediction reference picture can be put in any position of a reference picture list in the same way with an inter prediction reference picture.

In the context of multiview video coding, there are two kinds of motion vectors. One is normal motion vector pointing to temporal reference pictures and the corresponding temporal inter prediction is motion-compensated prediction (MCP). The other is disparity motion vector pointing to pictures in a different view (i.e., inter-view reference pictures) and the corresponding inter prediction is disparity-compensated prediction (DCP).

Currently, a Joint Collaboration Team on 3D Video Coding (JCT-3V) of VCEG and MPEG is developing a 3DV standard based on H.264/AVC, i.e., 3D-AVC. For 3D-AVC, new coding tools besides the inter-view prediction in MVC have been included and supported. The latest software 3D-ATM for 3D-AVC can be downloaded from the following link: [3D-ATM version 6.2]: http://mpeg3dv.research.nokia.com/svn/mpeg3dv/tags/3DV-ATMv6.2/

AVC based 3D video (3D-AVC) coding standard is currently under development by JCT-3V, and the latest version of 3D-AVC is now available in public: M. M. Hannuksela, Y. Chen, T. Suzuki, J.-R. Ohm, G. J. Sullivan, "3D-AVC draft text 5," JCT3V-C1002, Geneva, CH, January, 2013. It is available from the following link: http://phenix.it-sudparis.eu/jct2/doc_end_user/documents/3_Geneva/wg11/JCT3V-C1002-v3.zip.

3D-AVC is compatible to H.264/AVC in a way that the texture part of the base view is fully decodable for H.264/AVC decoder. For enhanced view components in 3D-AVC, the depth may be coded prior to the texture and a texture view component may be coded based on the information from the depth view component, which is also known as a depth-first coding. In contrast, each texture view component is coded before the respective depth view components in texture-first coding order.

For example, the coding orders of the texture and depth view components in the 3D-AVC may be exemplified as follows, wherein T0 and D0, respectively, refer to the texture and depth view components of the base view, and Ti and Di, respectively, refer to the texture and depth view components of the i-th dependent view. Here, we take three views for example.

T0 D0 D1 D2 T1 T2: The base views (T0 and D0) are coded with the texture-first coding order while the dependent view is coded with the depth-first coding order. The hybrid coding order is currently used in common test conditions of 3D-AVC.

T0 D0 T1 D1 T2 D2: All the view components are coded with the texture-first coding order.

If inter-view prediction is enabled for Ti, the reference texture view is defined as the view which includes the inter-view reference picture and the corresponding depth view is defined as the reference depth view which has the same view order index as that of the reference texture view.

The way in which a video coder may derive the disparity vector can vary with each low-level coding tool, but, commonly, the depth data of the dependent views is employed for the texture view component coding owing to the depth-first coding order. An in-loop block-based view synthesis inter-view prediction (BVSP) and depth-based motion vector prediction (D-MVP) in the 3D-AVC are the low-level coding tools, mainly, using the disparity vector converted from the depth values of the depth map in the dependent frame. In the 3D-AVC software, typically, the results of the conversion process from the actual depth map value to a disparity to a particular view are stored in look-up tables with camera parameters.

BVSP was originally proposed in JCT3V-A0107, which could be downloaded from the following link: http://phenix.it-sudparis.eu/jct2/doc_end_user/documents/1_Stockholm/wg11/JCT3V-A0107-v1.zip.

Figure 2:
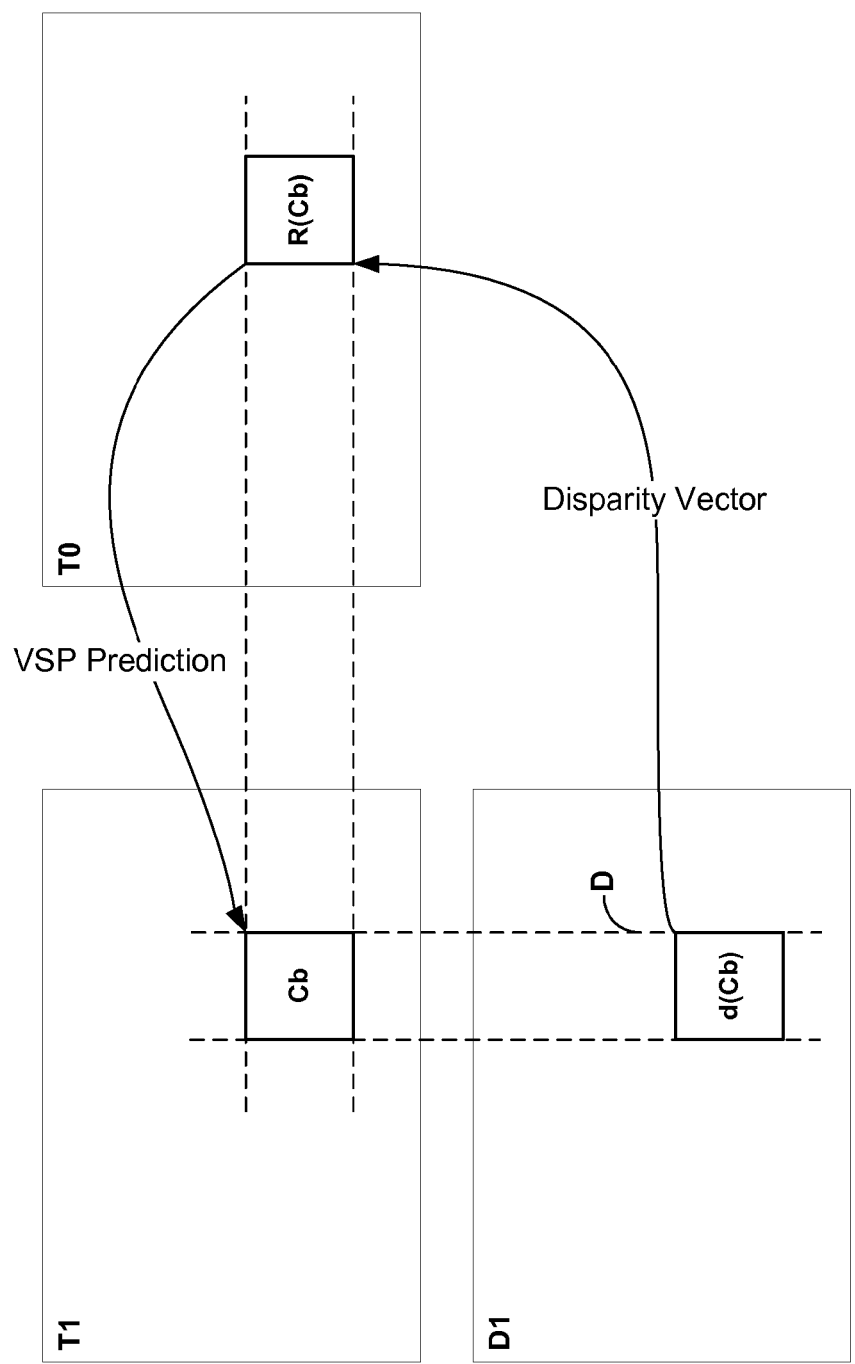
FIG. 2 is a conceptual diagram showing visualization of block-based view synthesis prediction (B-VSP) based on backwards warping.

FIG. 2 is a conceptual diagram showing visualization of block-based view synthesis prediction (B-VSP) based on backwards warping. Assume that the following coding order is utilized: (T0, D0, D1, T1). Texture component T0 is a base view and T1 is dependent view coded with the VSP. Depth map components D0 and D1 are respective depth map associated with T0 and T1.

In dependent view T1, sample values of currently coded block Cb are predicted from reference area R(Cb) that consists of sample values of the base view T0. The displacement vector between coded and reference samples is denoted as a derived disparity vector between T1 and T0 from a depth map value associated with a currently coded texture sample.

The process of conversion from a depth value to a disparity vector may be performed for example with following equations:

$$Z(Cb(j, i)) = \frac{1}{\frac{d(Cb(j,i))}{255} \cdot \left(\frac{1}{Znear} - \frac{1}{Zfar}\right) + \frac{1}{Zfar}};\quad (1)$$

$$D(Cb(j, i)) = \frac{f \cdot b}{Z(Cb(j,i))};\quad (2)$$

where j and i are local spatial coordinates within Cb, d(Cb(j,i)) is a depth map value in depth map image of a view #1, Z is its actual depth value, and D is the horizontal component of a derived disparity vector to a particular view #0. The parameters f, b, Znear and Zfar are parameters specifying the camera setup; i.e. the used focal length (f), camera separation (b) between view #1 and view #0 and depth range (Znear, Zfar) representing parameters of depth map conversion.

Note the vertical component of the derived disparity vector is always set equal to 0. In some 3DV-ATM implementations, equations (1) and (2) may have been already pre-computed for every depth map value (0 . . . 255) and stored as a look up-table.

Several implementation issues of block-based view synthesis prediction exist. The first issue is in regards to an indication of BVSP blocks. One flag at MB-level is used to signal whether current MB is coded with the conventional skip/direct mode or it is coded with the skip/direct mode but predicted from a synthetic reference component. For each MB partition (from 16×16 to 8×8), a reference index in each reference picture list is used to signal the reference picture. When a partition is coded as BVSP mode, the motion vector differences are not signaled since there are no motion vectors for BVSP coded blocks. When either the flag or the reference index indicates a synthetic reference component, the prediction of one partition as described in the following item is invoked.

There also may be issues with the prediction derivation process. For each MB partition with its size denoted by N×M (wherein N or M shall be 8 or 16), if it is coded with BVSP mode, current MB partition is further partitioned into several sub-regions with the size equal to K×K (wherein K may be 4×4, 2×2 or 1×1). For each sub-region, a separate derived disparity vector is derived and each sub-region is predicted from one block located by the derived disparity vector in the inter-view reference picture, i.e., R(cb) in FIG. 2 (Visualization of Block-based VSP(B-VSP) based on backward warping) in current common test conditions, K is defined to be 4. Note the derived disparity vectors are not stored for BVSP coded blocks since there are no coding tools use such vectors.

Further, there may also be issues with the disparity vector derivation process. When depth first coding order is applied, the derived disparity vector could be obtained by converting a depth value of the corresponding depth block in the corresponding non-base depth view, as shown in FIG. 2 (Visualization of Block-based VSP(B-VSP) based on backward warping). Several ways may be applied to select the depth value of one depth block, such as, the depth value of the center position of the depth block, the maximum value of all depth values within one depth block, the maximum value of four corner pixels within one depth block, the depth value of the bottom-right pixel of the depth block/depth MB. When texture first coding order is applied, BVSP modes will be disabled since the corresponding non-base depth view is unavailable when decoding the non-base texture view.

Depth-based motion vector prediction (D-MVP) in 3D-AVC for normal inter modes refers to a motion vector perdition method incorporating the associated depth map data in the current view which is available due to the depth-first coding order. The method may be applied with the texture view components in dependent views.

In 3D-AVC, the D-MVP method is incorporated into the conventional median function-based motion vector prediction in H.264/AVC. Specifically, the type of motion vector to be predicted (i.e., whether temporal motion vector or disparity motion vector) is first identified in a way that reference indices of the motion vectors in neighboring blocks are checked to know the type of motion prediction.

The neighboring blocks may include, in order, the left block, above block, above-right block and above-left block of the current block. The motion vector in above-left block is used only when one of the other three ones doesn't contain a motion vector thus considered as unavailable.

Afterwards, if three neighboring blocks are available, the motion vectors in the three neighboring blocks are employed for the motion vector prediction of that of the current block. In temporal prediction, if their motion vectors all have the same type and have the same reference indices, median filter is directly used as in H.264/AVC, otherwise (if they belong to different types and have the different reference indices), a motion vector is further derived. When the current reference picture is inter-view reference picture, the motion vector types and their reference indices in neighboring block positions are checked, and, if they have all the same type and the same reference indices, the median filter is applied. In both cases, if less than three neighboring blocks are available, motion vectors for the unavailable blocks are further derived so that three neighboring blocks become available.

A motion vector derived for a neighboring block is called a derived motion vector. In some examples, the derived motion vector is generated as follows. If the current motion vector belongs to a disparity motion vector, to derive the motion vector of the neighboring block and its motion vector may have a different type than that of the current motion vector or its motion vector is unavailable, the derived motion vector of this block is set to be a disparity motion vector, which is converted from the corresponding depth view component. The corresponding block of the depth view component the same view is used and the maximum value of the depth values of the four corners of this corresponding block is converted to a disparity value, which becomes the horizontal component of the derived motion vector. The vertical component of the derived motion vector is set to be zero.

If the current motion vector belongs to a temporal motion vector, the disparity value (derived similar as mentioned above) is used to get a temporal motion vector of the reference block in the reference (base) view and the derived motion vector is set to be the temporal motion vector. If the temporal motion vector is considered to be unavailable (Intra block or not pointing to a reference picture in the reference view aligned with the current reference picture), the derived motion vector is set to zero.

The inter-view motion prediction in the 3D-AVC is performed in P-skip, B-skip, B-16×16 direct mode, and B-8×8 direct mode. A disparity vector is firstly derived from the neighboring blocks as well as the disparity vector converted from the depth values of the depth view component of the same view.

If one available spatial neighboring block contains a disparity motion vector, this disparity motion vector becomes the disparity vector. Otherwise, for neighboring blocks that do not contain a disparity motion vector, a disparity motion vector of a block is converted from the depth values (similar to the conversion in D-MVP). Afterwards, a median filter is applied to three neighboring blocks to get the disparity vector.

The derived vector is used to identify a temporal motion vector of the reference block in the reference (base) view. If the temporal motion vector is unavailable, the reference index is firstly derived and the D-MVP aforementioned above is applied to produce a motion vector predictor.

A Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it should be guaranteed that there are only high-level syntax (HLS) changes in it, such that no module in the CU/PU level in HEVC needs to be re-designed and can be fully reused for MV-HEVC. For 3D-HEVC, new coding tools, including those in coding unit/prediction unit level, for both texture and depth views may be included and supported. The latest software 3D-HTM for 3D-HEVC can be downloaded from the following link: [3D-HTM version 7.0]: https://hevc.h-hi.fraunhofer.de/svn/svn_3DVCSoftware/tags/HTM-7.0/.

The latest reference software description as well as the working draft of 3D-HEVC is to be available as follows: Gerhard Tech, Krzysztof Wegner, Ying Chen, Sehoon Yea, "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4th Meeting: Incheon, KR, 20-26 Apr. 2013. It could be downloaded from the following link: http://phenix.it-sudparis.eu/jct2/doc_end_user/documents/4_Incheon/wg11/JCT3V-D1005-v1.zip To derive a disparity vector, the method called Neighboring Blocks based Disparity Vector (NBDV) may be used in current 3D-HTM. NBDV utilizes disparity motion vectors from spatial and temporal neighboring blocks. In NBDV, the motion vectors of spatial or temporal neighboring blocks are checked in a fixed checking order. Once a disparity motion vector or an IDV is identified, the checking process is terminated and the identified disparity motion vector is returned and converted to the disparity vector which will be used in inter-view motion prediction and inter-view residue prediction. If no such disparity vector is found after checking all the pre-defined neighboring blocks, a zero disparity vector will be used for the inter-view motion prediction while inter-view residual prediction will be disabled for the corresponding prediction unit (PU).

Figure 3:
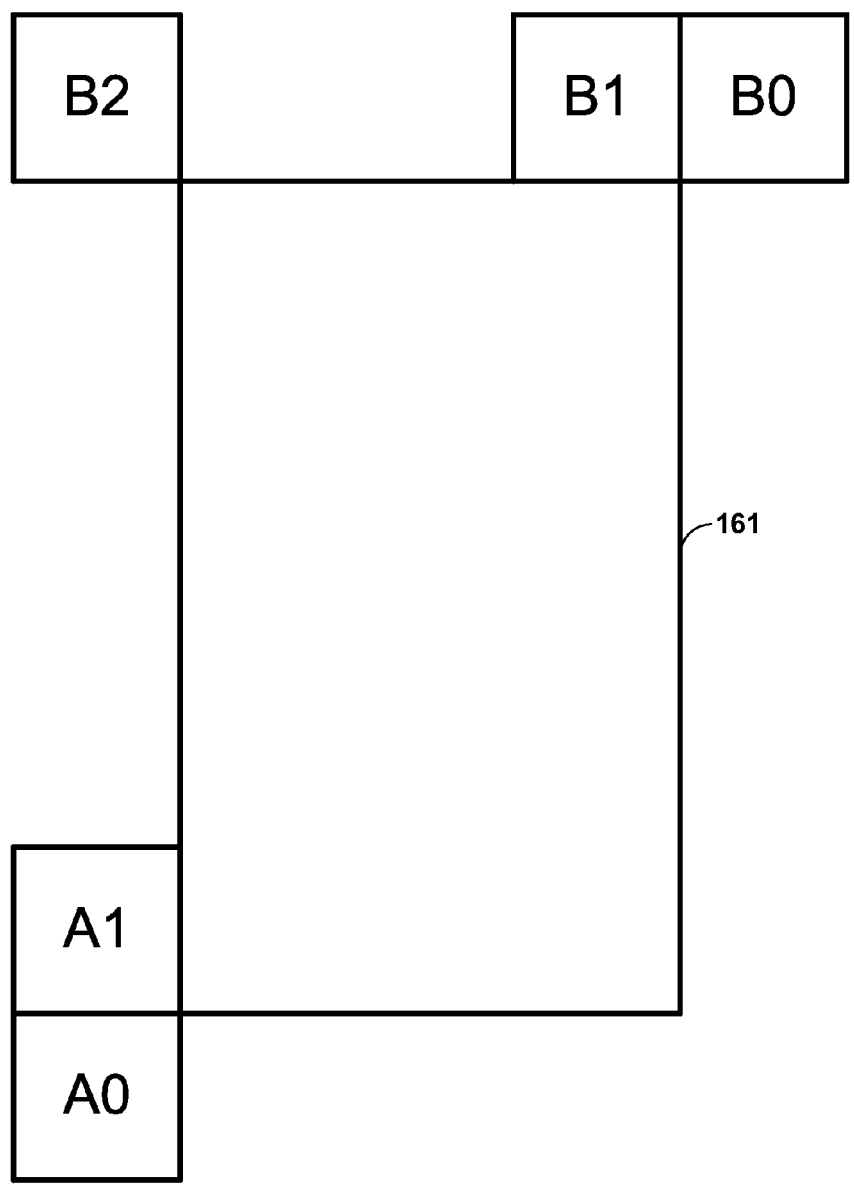
FIG. 3 is a conceptual illustration showing locations of blocks $A_1$, $B_1$, $B_0$, $A_0$, or $B_2$ relative to a current block shown in the center.

FIG. 3 is a conceptual illustration showing locations of blocks $A_1$, $B_1$, $B_0$, $A_0$, or $B_2$ relative to a current block shown in the center. The spatial and temporal neighboring blocks used for NBDV are introduced in the following part, followed by the checking order. Five spatial neighboring blocks are used for the disparity vector derivation. They are: the below-left, left, above-right, above and above-left blocks of current prediction unit (PU), denoted by $A_0$, $A_1$, $B_0$, $B_1$ or $B_2$, as defined in FIG. 3 relative a block 161.

Figure 4:
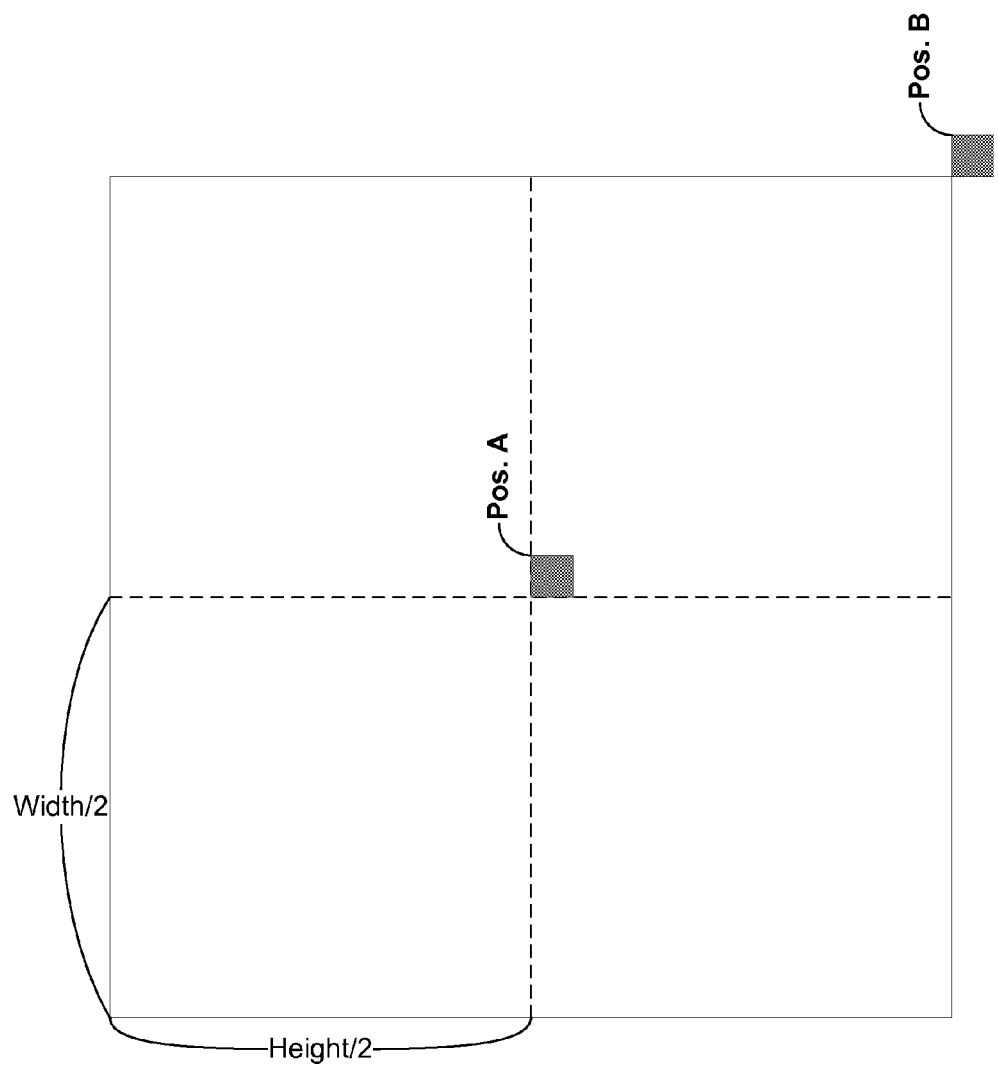
FIG. 4 is an illustration showing temporal neighboring blocks that may be used in coding according to a neighboring block-based disparity vector (NBDV) process.

FIG. 4 is an illustration showing temporal neighboring blocks that may be used in coding according to a neighboring block-based disparity vector (NBDV) process. Up to two reference pictures from current view, the co-located picture and the random-access picture or the reference picture with the smallest POC difference and smallest temporal ID are considered for temporal block checks. Random-access is first checked, followed by the co-located picture. For each candidate picture, two candidate blocks are checked: Center block (CR): The center 4×4 block of the co-located region of the current PU, see 'Pos. A' in FIG. 4. Bottom Right block (BR): Bottom-right 4×4 block of co-located region of the current PU, see 'Pos. B' in FIG. 4.

Whether DMVs are used is firstly checked for all the spatial/temporal neighboring blocks, followed by IDVs. Spatial neighboring blocks are firstly checked, followed by temporal neighboring blocks. Five spatial neighboring blocks are checked in the order of A1, B1, B0, A0 and B2. If one of them uses DMV, the checking process is terminated and the corresponding DMV will be used as the final disparity vector. For each candidate picture, the two blocks are checked in order, CR and BR for the first non-base view or BR, CR for the second non-base view. If one of them uses DMV, the checking process is terminated and the corresponding DMV will be used as the final disparity vector. Five spatial neighboring blocks are checked in the order of A0, A1, B0, B1 and B2. If one of them uses IDV and it is coded as skip/merge mode, the checking process is terminated and the corresponding IDV will be used as the final disparity vector.

The disparity vector, generated from the NBDV scheme could be further refined using the information in the coded depth map. That is, the accuracy of the disparity vector could be enhanced by taking benefit of the information coded base view depth map. The refinement steps are described as follows: 1) Locate a corresponding depth block by the derived disparity vector in the previously coded reference depth view, such as the base view; the size of the corresponding depth block is the same as that of current PU. 2) A disparity vector is calculated from the collocated depth block, from the maximum value of the four corner depth values. This is set equal to the horizontal component of a disparity vector, while the vertical component of the disparity vector is set to 0.

This new disparity vector may be called a "depth oriented neighboring block based disparity vector (DoNBDV)". The disparity vector from NBDV scheme is then replaced by this newly derived disparity vector from the DoNBDV scheme for inter-view candidate derivation for the AMVP and merge modes. Note that the unrefined disparity vector is used for inter-view residual prediction. In addition, the refined disparity vector is stored as the motion vector of one PU if it is coded with backward VSP mode.

In 3D-HEVC, when NBDV process doesn't find an available disparity motion vector from the neighboring blocks, a default disparity vector, zero, is set to be the disparity vector. It may be used for refining of disparity vector based on depth image. Furthermore, it is possible this disparity may be used for other decoding processes.

DLT is an optional coding tool. In the current HTM, the encoder will not use DLT if more than half the values from 0 to MAX_DEPTH_VALUE (e.g., 255 for 8-bit depth samples) appear in the original depth map at the analysis step. Otherwise, DLT will be coded in sequence/video parameter set. In order to code DLT, the number of valid depth values is coded with Exp-Golomb code first. Then each valid depth value is also coded with an Exp-Golomb code. The related syntax elements for signaling DLT are defined as follows:

| G.7.3.2.1.1 Video parameter set extension syntax | Descriptor |
|---|---|
| vps_extension( ) { | |
| ... | |
|   for( i = 0; i <= vps_max_layers_minus1; i++ ) { | |
|     if ( ( (i ! = 0) && !( i % 2 ) ) { | |
|       multi_view_mv_pred_flag[ i ] | u(1) |
|       multi_view_residual_pred_flag[ i ] | u(1) |
|     } | |
|     if ( i % 2 ) { | |
|       enable_dmm_flag[ i ] | u(1) |
|       use_mvi_flag[ i ] | u(1) |
|       lim_qt_pred_flag[ i ] | u(1) |
|       dlt_flag[ i ] | u(1) |
|       if( dlt_flag[ i ] ) { | |
|         num_depth_values_in_dlt[ i ] | ue(v) |
|         for ( j = 0; j < num_depth_values_in_dlt[ i ] ; j++) { | |
|           dlt_depth_value[ i ][ j ] | ue(v) |
|         } | |
|       } | |
|     } | |
|   } | |
| } | |

In some examples, the semantics for signaling DLT are defined as follows: dlt_flag[i] equal to 1 specifies that depth lookup table is used and that residual values for simplified depth coded coding units are to be interpreted as indices of the depth lookup table for depth view components with layer_id equal to i. dlt_flag[i] equal to 0 specifies that depth lookup table is not used and residual values for simplified depth coded coding units are not to be interpreted as indices for depth view components with layer_id equal to i. When dlt_flag[i] is not present, it shall be inferred to be equal to 0. num_depth_values_in_dlt[i] specifies the number of different depth values and the number of elements in the depth lookup table for depth view components of the current layer with layer_id equal to i. dlt_depth_value[i][j] specifies the j-th entry in the depth lookup table for depth view components with layer_id equal to i.

In JCT3V-E0125 and JCT3V-D0194, it has been proposed that a derived disparity vector can be maintained for a whole slice or a whole Coding Tree Block (CTB) row. The derived disparity vector is updated to be the disparity vector of the current CU, once the CU is coded. When NBDV process doesn't find an available disparity motion vector, the NBDV returns the DDV. However, the derived disparity vector is initialized to a default value. The default value of the derived disparity vector was currently proposed to be set to zero vector (0,0), although other values may be possible.

In JCT3V-E0190, it is proposed that a default disparity vector can be set to be the depth value converted from depth value equal to 128, or 1<<(depth_bit_depth−1), wherein depth_bit_depth is the bit depth of the depth pictures. In this case, the value of 128 may be converted to a disparity vector based on camera parameters as in the current 3D-HEVC. In addition, the value of 128 may be converted to an index in the DLT. The index may be further converted back to a representative depth value for that index (note the value must be close to 128). Such a default depth value, no matter it is 128 or some other value, can be converted to a disparity vector based on camera parameters.

In JCT3V-E0162, it is proposed that the disparity vector may be clipped so that the disparity vector doesn't consume as many bits as a motion vector. The clipping is based on the depth range.

In JCT3V-D0185, MB-level NBDV may be used to derive a disparity vector for the current MB and further used for motion vector prediction. Once a disparity motion vector is identified, i.e., one of the temporal or spatial neighboring block uses the inter-view reference picture, it is returned as the disparity vector for current MB.

Figure 5:
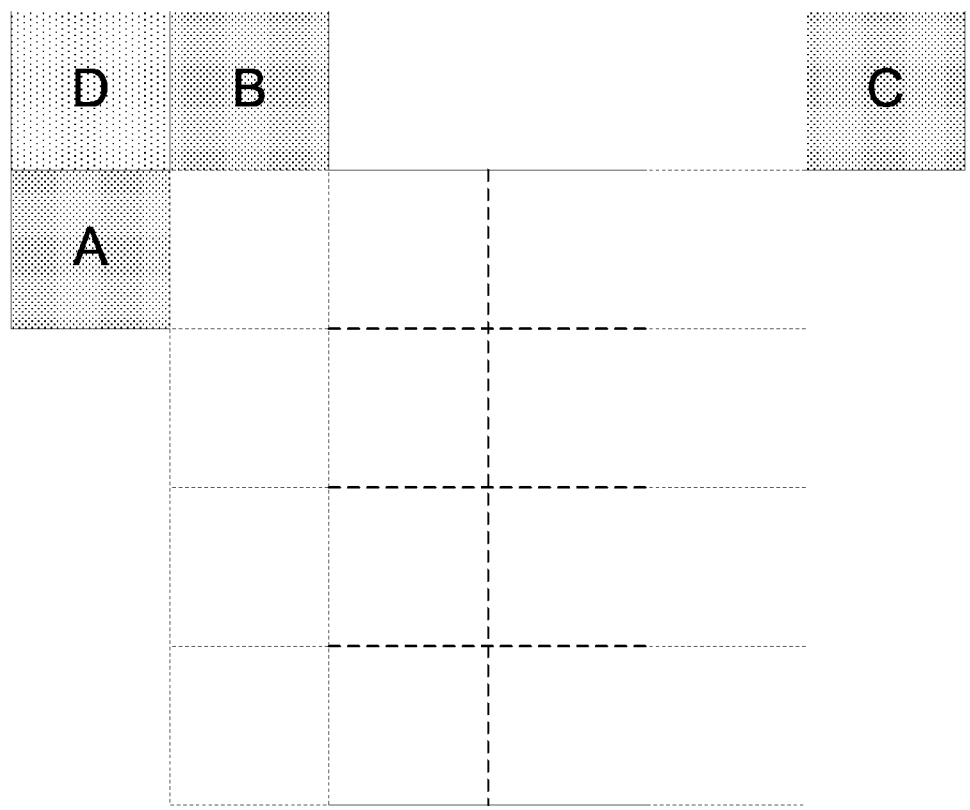
FIG. 5 is an illustration showing example spatial neighboring blocks for NBDV.

FIG. 5 is an illustration showing example spatial neighboring blocks for NBDV. Referring to FIG. 5, the spatial neighboring blocks that will be checked in AVC motion prediction process are checked in the order of A (left), B (above), C (above-right) and D (above-left) in the proposed NBDV process.

Figure 6:
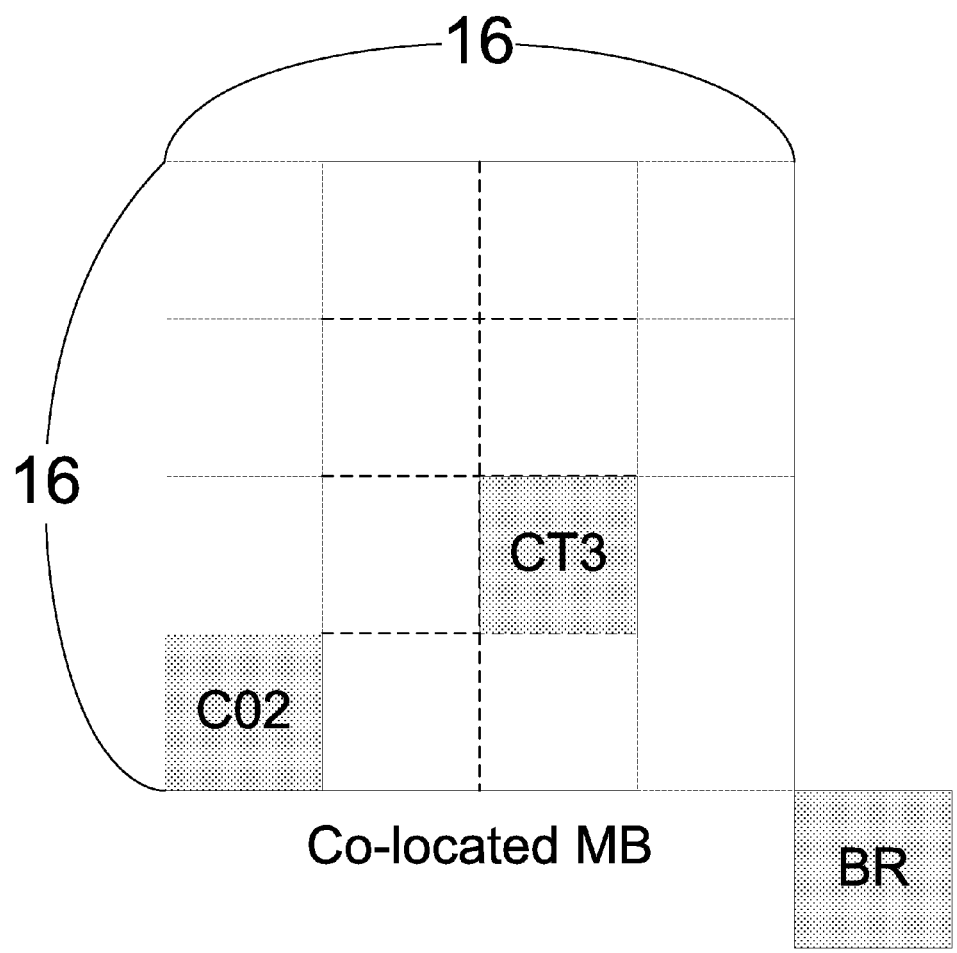
FIG. 6 is an illustration showing example temporal neighboring blocks for NBDV.

FIG. 6 is an illustration showing example temporal neighboring blocks for NBDV. Blocks from up to two reference pictures in the same view of the current picture are checked: (RefPicList1[0] and RefPicList0[0] for B slices and RefPicList0[0] for P slices). Currently three temporal blocks are checked picture by picture and for each picture, the co-located blocks relative to the co-located MB are checked as indicated below in order of BR (bottom-right), CT3 (center 3) and CO2 (corner 2), as shown in FIG. 6. Note that in JCT3V-E0136, it has been proposed that less temporal blocks can be used, e.g., by only accessing the BR.

The above mentioned neighboring blocks may be checked in order. Similar to 3D-HEVC, temporal neighboring blocks are checked first and the spatial neighboring blocks are checked afterwards. Once a block contains an available disparity motion vector, the derivation process terminates. Note that the proposed method enables texture-only coding, which is not efficiently supported in 3D-AVC. When enabling the same texture-only configuration, the coding gain from of the current 3D-AVC is only 1%.

Similar as in the derived disparity vector in 3D-AVC, a derived disparity vector may be maintained for a slice and updated to be the results of NBDV (with or without refinement) of a current MB. If the current MB doesn't find a disparity motion vector from the neighboring blocks during the NBDV process, the disparity vector may be set to be a default disparity vector. The default disparity vector may be set to be zero vector (0,0). Similar to JCT3V-E0190, in JCT3V-E0148, a default disparity vector may be converted from a depth value equal to 127.

The NBDV can be further improved by accessing the depth view component of a base/reference view. The disparity vector derived from the neighboring blocks may be used to locate depth pixels in the depth view component, such that the disparity vector can be further refined. As shown above, this method may provide as much as 5% more coding gain, although access depth view component is still required.

The setting of default disparity vectors in 3D-HEVC, 3D-AVC, and other types of three dimensional AVC standards, such as multiview video coding plus depth (MVC+D), may exhibit one or more of the following problems. Zero disparity vector might not always be very efficient. A default disparity vector from a default depth value might be more efficient. A default disparity vector derived by converting a fix value of depth requires the presence of camera parameters. However, the camera parameters are not always present especially when multiview compatibility is required thus no camera parameters may be present.

In some examples, this disclosure provides an adaptive method of setting the default disparity vector in 3D-AVC, MVC+D, and 3D-HEVC. The default disparity vector can be used in various scenarios, for example when NBDV process doesn't find an available disparity motion vector from the neighboring blocks and/or when the derived disparity vector is initialized.

When a depth presence condition is true, the default disparity vector is converted from a depth value using camera parameters, otherwise, the default disparity vector is set to a zero vector. The depth presence condition may be set by checking if the camera parameters are present. In this case, a flag is introduced in sequence parameter set or video parameter set to indicate the presence of camera parameters. The depth presence condition may be set by checking if the multiview/stereo compatibility is required.

In some examples, when the depth presence condition is true, a disparity vector derived by NBDV is clipped in a range based on the depth range, similar as in JCT3V-E0162, otherwise, the disparity vector is not clipped. Alternatively, the disparity vector range is explicitly signaled in VPS, SPS, PPS or slice header and can be different for different views or different for different view papers. The singling of the disparity range may also include a singling of number of bytes or bits used for a disparity vector, or the number of bytes or bits used for each component of a disparity vector. In this case, the clipping can be done without considering the depth range.

In 3D-HEVC, an example of techniques of the current disclosure may be implemented with the following syntax. Note that ViewIdx[nuh_layer_id] and potentially also VpsDepthFlag[nuh_layer_id] are derived from VPS extension hence a parsing dependency from VPS occurs here.

| | Descriptor |
|---|---|
| sps_extension2( ) { | |
|    cam_para_present_flag | u(1) |
|    if( !VpsDepthFlag[ nuh_layer_id ] ) { | |
|    [Ed. (GT): Parsing dependency from VPS] | |
|       cp_precision | ue(v) |
|       cp_in_slice_header_flag | u(1) |
|       if( !cp_in_slice_header_flag) { | |
|          for ( i = 0; i < ViewId[ nuh_layer_id ]; i++ ) { | |
|          [Ed. (GT): Parsing dependency from VPS] | |
|             cp_scale[ i ] | se(v) |
|             cp_off[ i ] | se(v) |
|             cp_inv_scale_plus_scale[ i ] | se(v) |
|             cp_inv_off_plus_off[ i ] | se(v) |
|          } | |
|       } | |
|    } | |
| } | |

For the above example syntax, the technique may have the following semantics. cam_para_present_flag equal to 1 indicates the camera parameters are present, more specifically the cp_precision, cp_scale[j], cp_off[j], cp_inv_scale_plus_scale[j], and cp_inv_off_plus_off[j] are present in the sequence parameter set. cam_para_present_flag equal to 0 indicates camera parameters are not present. When not present, cam_para_present_flag is inferred to be equal to 0. DefaultDvFromDepth[layerId] is set to cam_para_present_flag, wherein the layerId is the nuh_layer_id of the current slice. Alternatively if depth_refinement_flag[layerId] and view_synthesis_pred_flag[layerId] are both equal to 0, DefaultDvFromDepth[layerId] is set to 0, otherwise, DefaultDvFromDepth[layerId] is set to 1. Alternatively if there is a flag indicating multiview/stereo compatibility, namely multiview_compatible_flag[layerId], DefaultDvFromDepth[layerId] is set to as follows: DefaultDvFrom- Depth[layerId]=! multiview_compatible_flag[layerId]. The default disparity vector is set as follows: If DefaultDvFromDepth[layerId] is equal to 0, it is set to be a zero disparity vector. Otherwise, it is derived by converting a depth value d to a disparity vector utilizing camera parameters. Note that the conversion process may be similar as in the current 3D-HEVC when a depth value is used to derive a disparity vector. The depth value d may be 128, 127, 1<<(depth_bit_depth-1), wherein depth_bit_depth is the bit depth of the depth pictures, (1<<(depth_bit_depth-1))-1 or any of the other methods as in JCT3V-E0190 and JCT3V-E0148.

Figure 7:
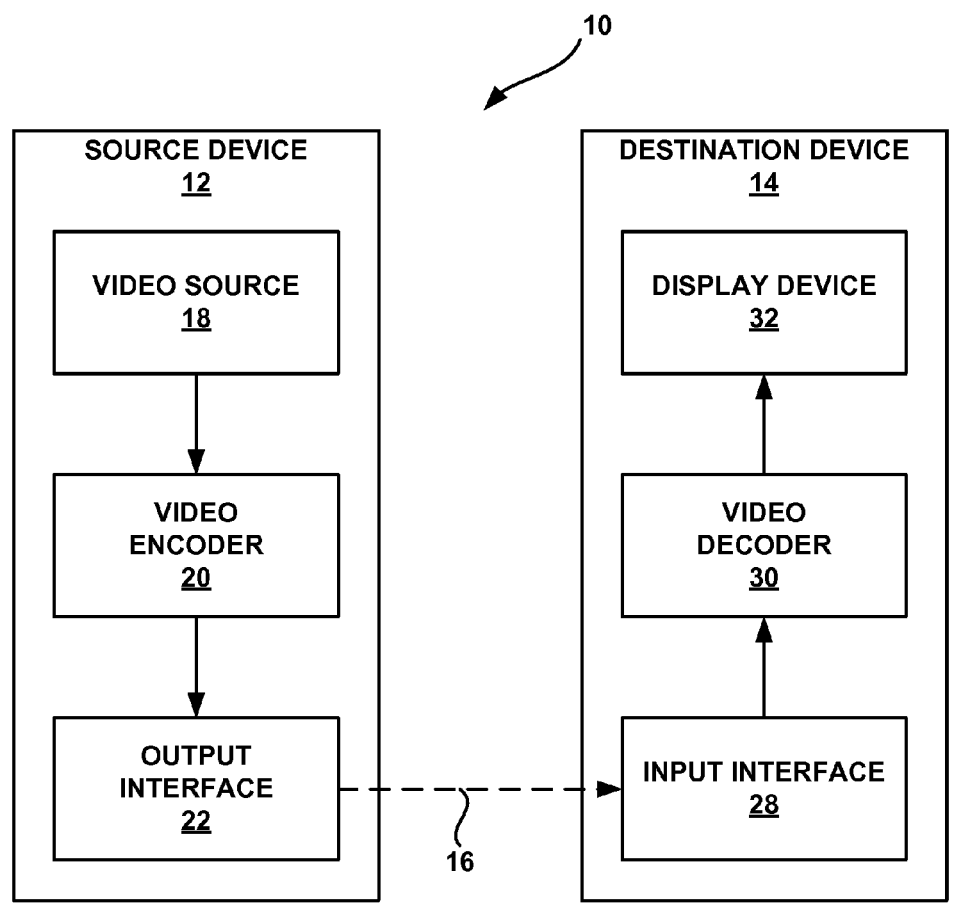
FIG. 7 is a block diagram illustrating an example video coding system that may utilize the techniques of this disclosure.

FIG. 7 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding and may follow standards such as 3D-HEVC, MVC+D, or 3D-AVC.

As shown in FIG. 7, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include various types of devices, such as routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 7, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 7, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. In other examples, video encoder 20 and video decoder 30 may operate according to other video compression standards, including the High Efficiency Video Coding (HEVC)

standard presently under development. A draft of the HEVC standard currently being developed, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which as of Jul. 26, 2013 is downloadable from http://phenix.int-evry.fr/jct/doc_end_user/documents/11_Shanghai/wg11/JCTVC-K1003-v8.zip. The techniques of this disclosure, however, are not limited to any particular coding standard or technique. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Jul. 26, 2013, is downloadable from http://phenix.int-evry.fr/jct/doc_end_user/documents/12_Geneva/wg11/JCTVC-L1003-v34.zip. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013, which as of Jul. 26, 2013, is available from http://phenix.int-evry.fr/jct/doc_end_user/documents/13_Incheon/wg11/JCTVC-M0432-v3.zip.

FIG. 7 is merely an example and the techniques of this disclosure may apply to video coding settings (e.g., video encoding or video decoding) that do not necessarily include any data communication between the video encoding device and the video decoding device. In other examples, data is retrieved from a local memory, streamed over a network, or the like. A video encoding device may encode and store data to memory, and/or a video decoding device may retrieve and decode data from memory. In many examples, the video encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device. Each of video encoder 20 and video decoder 30 may be configured to code video data according to one or more video coding standards, such as 3D-HEVC, MVC+D, or 3D-AVC.

This disclosure may generally refer to video encoder 20 "signaling" certain information. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which a video decoding device may then retrieve at any time after being stored to this medium. In some examples, from an encoder perspective, signaling may include generating an encoded bitstream, and from a decoder perspective, signaling may include receiving and parsing a coded bitstream.

As mentioned briefly above, video encoder 20 encodes video data. The video data may comprise one or more pictures. Each of the pictures is a still image forming part of a video. When video encoder 20 encodes the video data, video encoder 20 may generate a bitstream. The bitstream may include a sequence of bits that form a coded representation of the video data. The bitstream may include coded pictures and associated data. A coded picture is a coded representation of a picture. The associated data may include sequence parameter sets (SPSs), picture parameter sets (PPSs), video parameter sets (VPSs), adaptive parameter sets (APSs), slice headers, block headers, and other syntax structures.

A picture may include three sample arrays, denoted SL, SCb and SCr. SL is a two-dimensional array (i.e., a block) of luma samples. Luma samples may also be referred to herein as "Y" samples. SCb is a two-dimensional array of Cb chrominance samples. SCr is a two-dimensional array of Cr chrominance samples. Chrominance samples may also be referred to herein as "chroma" samples. Cb chrominance samples may be referred to herein as "U samples." Cr chrominance samples may be referred to herein as "V samples."

In some examples, video encoder 20 may down-sample the chroma arrays of a picture (i.e., SCb and SCr). For example, video encoder 20 may use a YUV 4:2:0 video format, a YUV 4:2:2 video format, or a 4:4:4 video format. In the YUV 4:2:0 video format, video encoder 20 may down-sample the chroma arrays such that the chroma arrays are ½ the height and ½ the width of the luma array. In the YUV 4:2:2 video format, video encoder 20 may down-sample the chroma arrays such that the chroma arrays are ½ the width and the same height as the luma array. In the YUV 4:4:4 video format, video encoder 20 does not down-sample the chroma arrays.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs).

As part of encoding a picture, video encoder 20 may generate encoded representations of each slice of the picture (i.e., coded slices). To generate a coded slice, video encoder 20 may encode a series of CTUs. This disclosure may refer to an encoded representation of a CTU as a coded CTU. In some examples, each of the slices includes an integer number of coded CTUs.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single MV. When video encoder 20 uses uni-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. For 3D coding, depth values in depth blocks may likewise be represented as sample values, each indicating a level of depth associated with a given pixel location. The techniques of this disclosure are applicable to the coding of depth blocks, particularly in modes such as skip mode or merge mode where a list of candidates is generated for inheriting or using motion information of a selected candidate, in coding the depth block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive sample blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some cases, video encoder 20 may signal the motion information of a PU using merge mode or a skip mode, or possibly an advanced MV prediction (AMVP) mode. The motion information of a PU may include motion vector(s) of the PU and reference index(s) of the PU. When video encoder 20 signals the motion information of a current PU using merge mode, video encoder 20 generates a merge candidate list. The merge candidate list includes a set of candidates. The candidates may indicate the motion information of PUs that spatially or temporally neighbor the current PU. Video encoder 20 may then select a candidate from the candidate list and may use the motion information indicated by the selected candidate as the motion information of the current PU. Furthermore, in merge mode, video encoder 20 may signal the position in the candidate list of the selected candidate. Video decoder 30 may generate the same candidate list and may determine, based on the indication of the position of the selected candidate, the selected candidate. Video decoder 30 may then use the motion information of the selected candidate to generate predictive samples for the current PU, and may generate a residual signal as the difference between the current PU and predictive samples of the predictive PU identified in the merge mode.

Skip mode is similar to merge mode in that video encoder 20 generates a candidate list and selects a candidate from the list of candidates. However, when video encoder 20 signals the motion information of a current PU (e.g. a depth block) using skip mode, video encoder 20 may avoid generation of any residual signal.

AMVP mode is similar to merge mode in that video encoder 20 generates a candidate list and selects a candidate from the list of candidates. However, when video encoder 20 signals the motion information of a current PU (e.g. a depth block) using AMVP mode, video encoder 20 may signal a motion vector difference (MVD) for the current PU and a reference index in addition to signaling a position of the selected candidate in the candidate list. An MVD for the current PU may indicate a difference between an MV of the current PU and an MV of the selected MV candidate. In uni-prediction, video encoder 20 may signal one MVD and one reference indexes for the current PU. In bi-prediction, video encoder 20 may signal two MVDs and two reference indexes for the current PU. For depth block prediction consistent with this disclosure, video encoder 20 would typically signal one MVD and one reference indexes for the current PU, although depth block prediction could also use techniques similar to bi-prediction where two MVDs and two reference indexes are signaled.

Furthermore, when the motion information of a current PU is signaled using AMVP mode, video decoder 30 may generate the same candidate list and may determine, based on the indication of the position of the selected candidate, the selected candidate. Video decoder 30 may recover an MV of the current PU by adding a MVD to the MV of the selected candidate. Video decoder 30 may then use the recovered MV or MVs of the current PU to generate predictive sample blocks for the current PU.

In accordance with this disclosure, video encoder 20 and video decoder 30 may perform one or more techniques described herein as part of a video coding process (e.g., video encoding or video decoding). Video encoder 20 may determine whether a depth condition should be set to valid within a coded bitstream. If the depth condition should be set to valid, video encoder 20 may define a default disparity vector based on camera parameters. In some examples, video encoder 20 may further clip a range associated with the default disparity vector if the depth condition should be set to valid. If the depth condition is not valid, video encoder 20 may define the default disparity vector to be zero. In some examples, video encoder 20 may further avoid clipping the range if the depth condition should not be set to valid. The video decoder 30 may then determine whether the depth condition is valid. If the depth condition is valid, video decoder 30 may generate a default disparity vector based on camera parameters. In some examples, video decoder 30 may further clip a range associated with the default disparity vector if the depth condition is valid. If the depth condition is not valid, video decoder 30 may set the default disparity vector to zero. In some examples, video decoder 30 may further avoid clipping the range if the depth condition is not valid. In some examples, video decoder 30 may further determine a disparity vector range from one or more elements signaled in a coded bitstream and generate a disparity vector using the disparity vector range.

Figure 8:
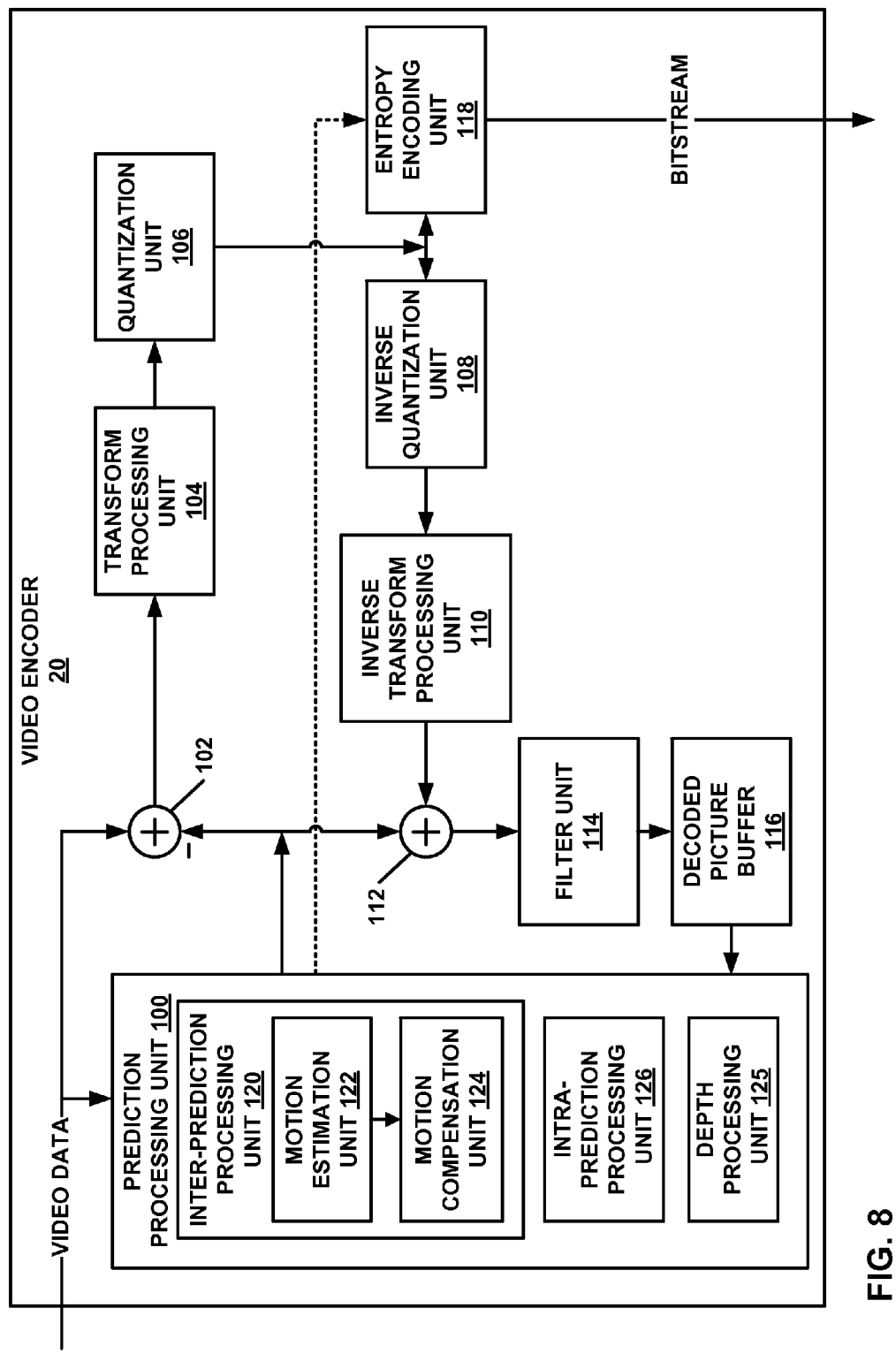
FIG. 8 is a block diagram illustrating an example video encoder that may implement the techniques of this disclosure.

FIG. 8 is a block diagram illustrating an example video encoder 20 that may implement the techniques of this disclosure. FIG. 8 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods, such as MVC+D, 3D-AVC, or 3D-HEVC.

In the example of FIG. 8, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the sample blocks of the PU. Motion estimation unit 122 may generate a reference index that indicates a position in RefPicList0 of the reference picture containing the reference region for the PU. In addition, motion estimation unit 122 may generate an MV that indicates a spatial displacement between a coding block of the PU and a reference location associated with the reference region. For instance, the MV may be a two-dimensional vector that provides an offset from the coordinates in the current decoded picture to coordinates in a reference picture. Motion estimation unit 122 may output the reference index and the MV as the motion information of the PU. Motion compensation unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive sample blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference picture indexes that indicate positions in RefPicList0 and RefPicList1 of the reference pictures that contain the reference regions. In addition, motion estimation unit 122 may generate MVs that indicate spatial displacements between the reference location associated with the reference regions and a sample block of the PU. The motion information of the PU may include the reference indexes and the MVs of the PU. Motion compensation unit 124 may generate the predictive sample blocks of the PU based at least in part on actual or interpolated samples at the reference region indicated by the motion vector of the PU.

In accordance with one or more techniques of this disclosure, one or more units within video encoder 20 may perform one or more techniques described herein as part of a video encoding process. Additional 3D components may also be included within video encoder 20, such as for example, depth processing unit 125. Depth processing unit 125 may perform the techniques in some examples.

In one example, depth processing unit 125 (or another unit of video encoder 20) may perform a method of encoding data associated with 3D video. The method may comprise determining whether a depth condition associated with the block of video data is valid. When the depth condition should be set to valid, depth processing unit 125 may set the depth condition to valid and encode a block of video data using at least one camera parameter.

In another example, depth processing unit 125 (or another unit of video encoder 20) may perform a method of encoding data associated with 3D video. The method may comprise determining whether a depth condition should be set to valid within a coded bitstream; if the depth condition should be set to valid, defining a default disparity vector based on camera parameters; and if the depth condition is not valid, defining the default disparity vector to be zero.

In another example, depth processing unit 125 (or another unit of video encoder 20) may perform a method of encoding data associated with 3D video. The method may comprise determining whether a depth condition should be set to valid within a coded bitstream; if the depth condition should be set to valid, clipping a range associated with a disparity vector; and if the depth condition should not be set to valid, avoiding clipping the range.

In either example of the previous paragraphs, the methods may further comprise setting the depth condition in the coded bitstream. Setting the depth condition may comprise setting a value, such as a cam_para_present_flag. The cam_para_present_flag equal to 1 may indicate that camera parameters are present, and may also mean that the depth condition is valid. In examples, the syntax element, such as the cam_para_present_flag, may be located on one of a video parameter set, and a sequence parameter set. Determining whether a depth condition should be set to valid may comprise checking whether camera parameters will be present in the coded bitstream.

Continued reference is now made to the example of FIG. 8. Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In accordance with techniques of this disclosure, various units of video encoder 20, such as depth processing unit 125, may perform techniques of this disclosure. For example, depth processing unit 125 may determine whether a depth condition should be set to valid within a coded bitstream. If the depth condition should be set to valid, depth processing unit 125 may set the depth condition to valid and encode the block of video data using at least one camera parameter.

In some examples, depth processing unit 125 may perform further actions based on the depth condition. In one example, depth processing unit 125 may check a neighboring block for a disparity motion vector associated with the neighboring block. Depth processing unit 125, in response to determining that the neighboring block does not have a disparity motion vector, may define a default disparity vector based on camera parameters when the depth condition should be set to valid. When the depth condition should not be set to valid, depth processing unit 125 may instead define the default disparity vector to be 0. In some examples, depth processing unit 125 may further clip a range associated with the default disparity vector if the depth condition should be set to valid. If the depth condition is not valid, depth processing unit 125 may define the default disparity vector to be zero. In some examples, depth processing unit 125 may further avoid clipping the range if the depth condition should not be set to valid.

Figure 9:
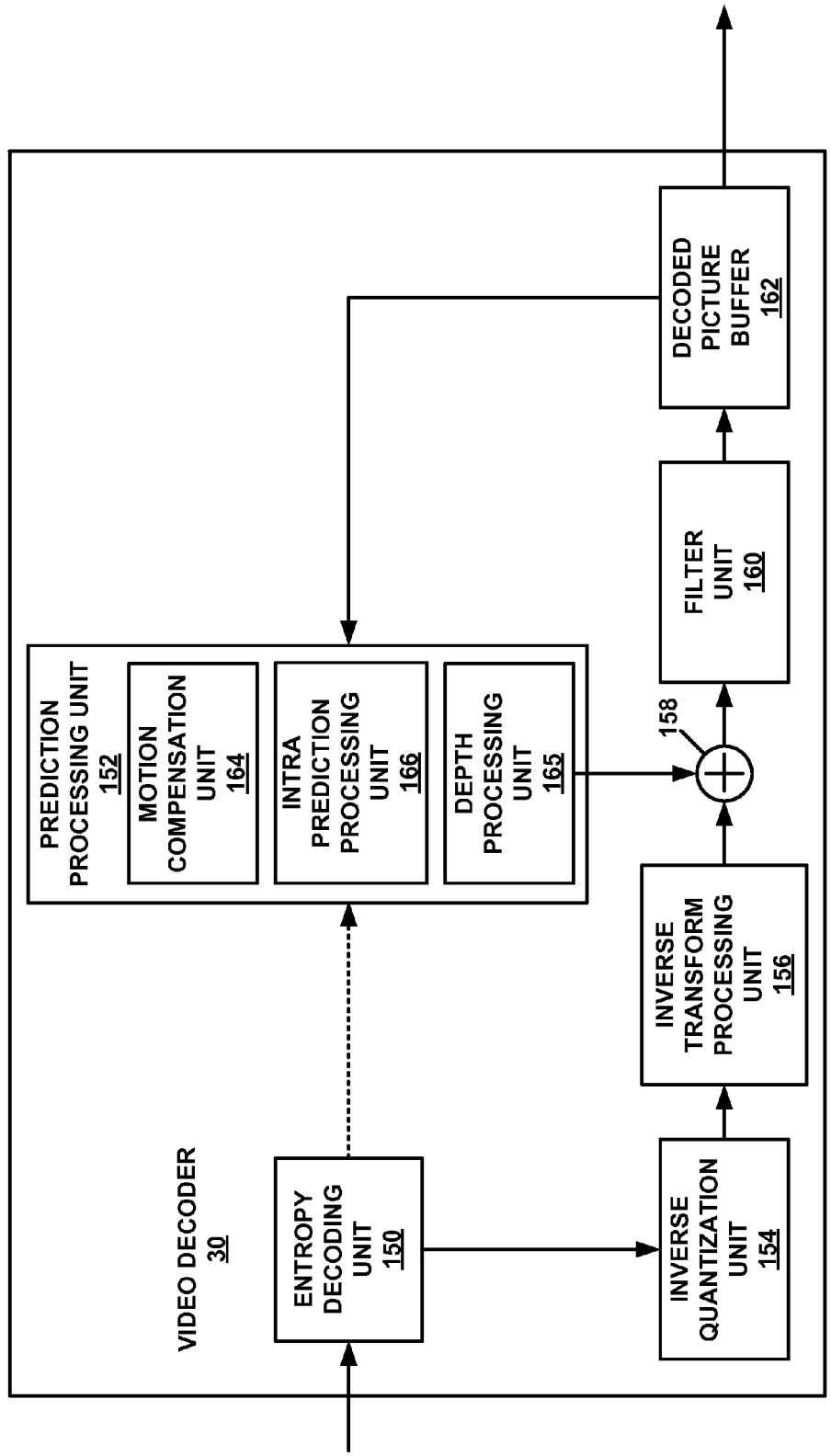
FIG. 9 is a block diagram illustrating an example video decoder that may implement the techniques of this disclosure.

FIG. 9 is a block diagram illustrating an example video decoder 30 that is configured to implement the techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods, such as MVC+D, 3D-AVC, or 3D-HEVC.

In the example of FIG. 9, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

As indicated above, video encoder 20 may signal the motion information of a PU using merge mode, skip mode or AMVP mode. When video encoder 20 signals the motion information of a current PU using AMVP mode, entropy decoding unit 150 may decode, from the bitstream, a reference index, a MVD for the current PU, and a candidate index. Furthermore, motion compensation unit 164 may generate an AMVP candidate list for the current PU. The AMVP candidate list includes one or more MV predictor candidates. Each of the MV predictor candidates specifies a MV of a PU that spatially or temporally neighbors the current PU. Motion compensation unit 164 may determine, based at least in part on the candidate index, a selected MV predictor candidate in the AMVP candidate list. Motion compensation unit 164 may then determine the MV of the current PU by adding the MVD to the MV specified by the selected MV predictor candidate. In other words, for AMVP, MV is calculated as MV=MVP+MVD, wherein the index of the motion vector predictor (MVP) is signaled and the MVP is one of the MV candidates (spatial or temporal) from the AMVP list, and the MVD is signaled to the decoder side.

If the current PU is bi-predicted, entropy decoding unit 150 may decode an additional reference index, MVD, and candidate index from the bitstream. Motion compensation unit 162 may repeat the process described above using the additional reference index, MD, and candidate index to derive a second MV for the current PU. In this way, motion compensation unit 162 may derive a MV for RefPicList0 (i.e., a RefPicList0 MV) and a MV for RefPicList1 (i.e., a RefPicList1 MV).

In accordance with one or more techniques of this disclosure, one or more units within video decoder 30 may perform one or more techniques described herein as part of a video decoding process. Additional 3D components may also be included within video decoder 30, such as for example, depth processing unit 165. Depth processing unit 165 may perform the techniques in some examples.

In one example, depth processing unit 165 (or another unit of video decoder 30) may perform a method of encoding data associated with 3D video. The method may comprise determining whether a depth condition associated with the block of video data is valid. When the depth condition is valid, depth processing unit 165 may decode a block of video data using at least one camera parameter.

In some examples, depth processing unit 165 may perform further actions based on the depth condition. In one example, depth processing unit 125 may check a neighboring block for a disparity motion vector associated with the neighboring block. Depth processing unit 165, in response to determining that the neighboring block does not have a disparity motion vector, may generate a default disparity vector based on camera parameters when the depth condition should be set to valid. When the depth condition should not be set to valid, depth processing unit 165 may instead set the default disparity vector to be 0.

Determining whether the depth condition is valid may comprise checking a value in a coded bitstream. The value in the coded bitstream may be a cam_para_present_flag. The cam_para_present_flag equal to 1 may indicate that camera parameters are present, and may indicate that the depth condition is valid. Determining whether a depth condition is valid may comprise checking whether camera parameters are present in a coded bitstream. Checking whether camera parameters are present in the coded bitstream may comprise checking a flag. The flag may be located on one of a video parameter set, and a sequence parameter set. Any steps of "checking" may comprise parsing a bitstream.

In some examples, depth processing unit 165 or another unit of video decoder may perform a method of decoding data associated with 3D video that comprises determining whether a depth condition is valid. When the depth condition is valid, clipping a range associated with a disparity vector, and, when the depth condition is not valid, avoiding clipping the range.

In some examples, depth processing unit 165 or another unit of video decoder may perform a method of decoding data associated with 3D video that comprises determining a disparity vector range from one or more elements explicitly signaled in a coded bitstream. Depth processing unit 165 may further generate a disparity vector using the disparity vector range. The disparity vector range may be explicitly signaled in one or more of a video parameter set, a sequence parameters set, a picture parameter set, and a slice header. In some cases, the disparity vector range can be different for different views. In some examples, the disparity vector range can be different for different view papers. The disparity vector range may be signaled as a number of bytes or a number of bits to be used for a disparity vector. Alternatively, the disparity vector range may be signaled as a number of bytes or a number of bits to be used for each component of a disparity vector. Clipping of the disparity vector can be performed without considering a depth range.

In some examples, when the flag is equal to 1, one or more coding techniques that require at least one camera parameter for encoding or decoding at least one block of video data may be enabled. Alternatively, when the flag is equal to 0, such coding techniques may be disabled. For instance, techniques of this disclosure include defining and generating disparity vectors based on at least one camera parameter. When the flag is equal to 1, indicating that the depth condition is valid, these techniques may be enabled. Alternatively, when the flag is equal to 0, the requisite camera parameters for these techniques are not present, thereby disabling these techniques. While this is one example of a coding technique, there may be other coding techniques that rely on the availability of camera parameters and the depth condition being valid. When the flag is equal to 1, any coding technique that relies on the availability of camera parameters and the depth condition being valid may be enabled. The same coding techniques may be disabled when the flag is equal to 0.

Continuing reference is now made to FIG. 9. Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 7. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with techniques of this disclosure, various units of video decoder 30, such as depth processing unit 165, may perform techniques of this disclosure. For example, depth processing unit 165 may determine whether the depth condition is valid. If the depth condition is valid, depth processing unit 165 may decode the block of video data using at least one camera parameter.

In some examples, depth processing unit 165 may perform further actions based on the depth condition. In one example, depth processing unit 125 may check a neighboring block for a disparity motion vector associated with the neighboring block. Depth processing unit 165, in response to determining that the neighboring block does not have a disparity motion vector, may generate a default disparity vector based on camera parameters when the depth condition should be set to valid. When the depth condition should not be set to valid, depth processing unit 165 may instead set the default disparity vector to be 0. In some examples, depth processing unit 165 may further clip a range associated with the default disparity vector if the depth condition is valid. In some examples, depth processing unit 165 may further avoid clipping the range if the depth condition is not valid. In some examples, depth processing unit 165 may further determine a disparity vector range from one or more elements signaled in a coded bitstream and generate a disparity vector using the disparity vector range.

Figure 10:
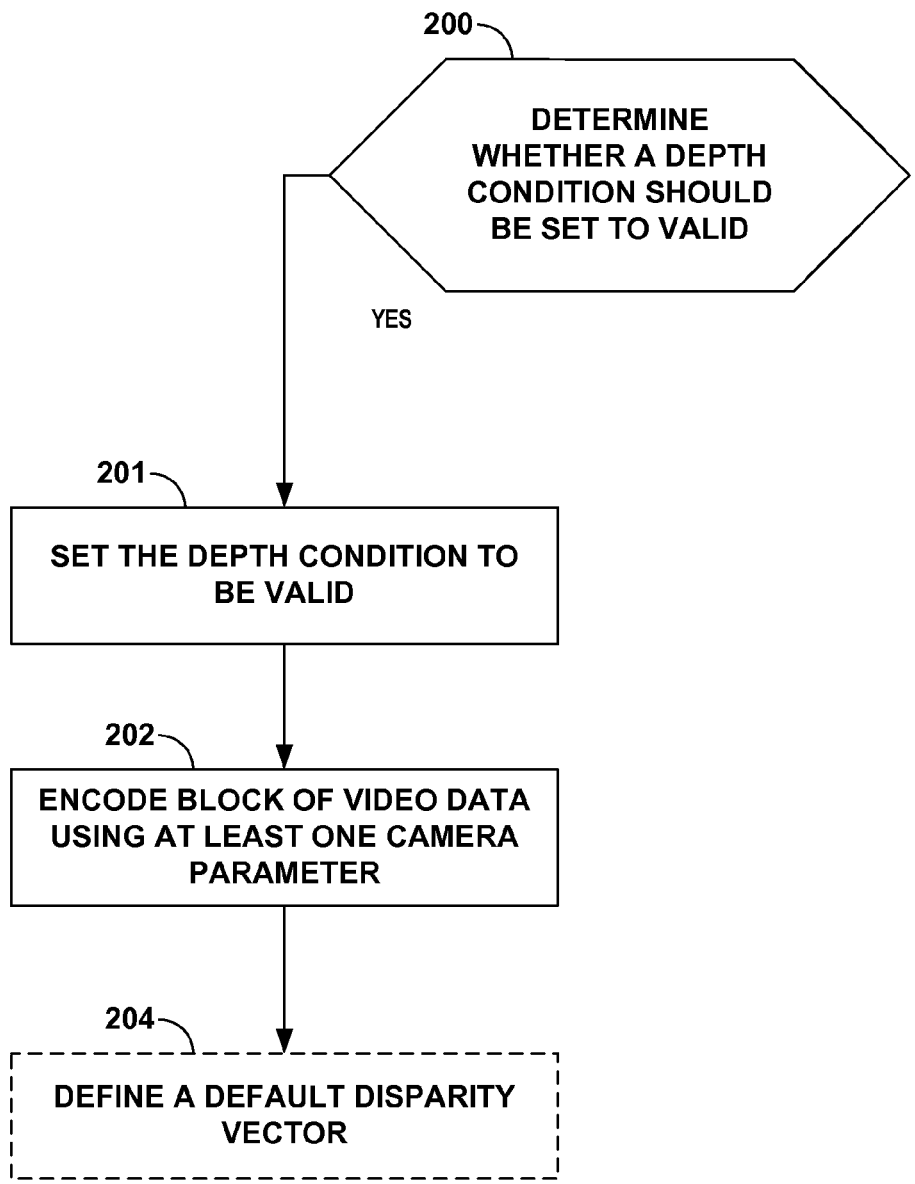
FIG. 10 is a flow diagram illustrating a technique for encoding video data, in accordance with one or more techniques of this disclosure.

FIG. 10 is a flow diagram illustrating a technique for encoding video data, in accordance with one or more techniques of this disclosure. In this example, the disclosure is directed to a video coding device, such as a video encoder 20. Video encoder 20 may be configured to determine whether a depth condition associated with the data should be set to valid within a coded bitstream (200). If the depth condition should be set to valid ("YES" of 200), video encoder 20 sets the depth condition to valid (201). Video encoder 20 further encodes the block of video data using at least one camera parameter (202). In some examples, video encoder 20 further defines a default disparity vector based on camera parameters if a neighboring block does not have a disparity motion vector (204). In some examples, video encoder 20 may perform at least one of depth-oriented neighboring block disparity vector (DoNBDV) prediction or view synthesis prediction. For example, after determining that the depth condition should be set to valid, video encoder 20 may perform at least one of depth-oriented neighboring block disparity vector (DoNBDV) prediction or view synthesis prediction.

Figure 11:
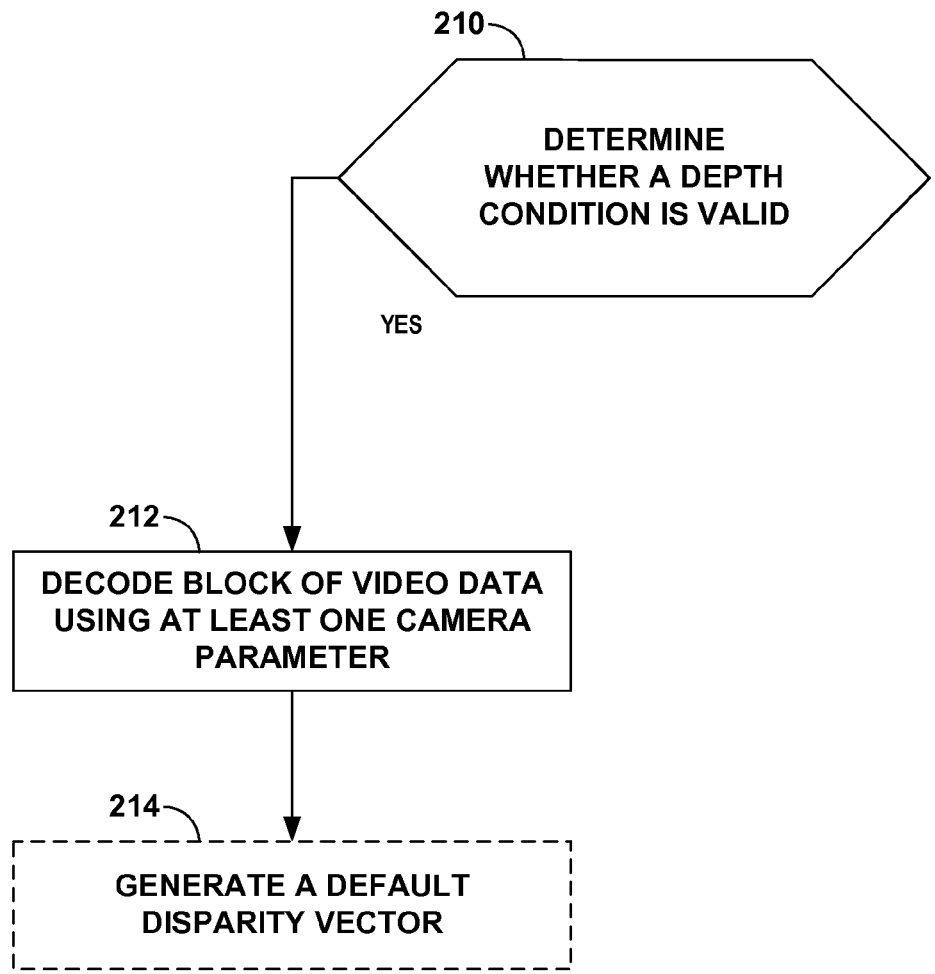
FIG. 11 is a flow diagram illustrating a technique for decoding video data, in accordance with one or more techniques of this disclosure.

FIG. 11 is a flow diagram illustrating a technique for decoding video data, in accordance with one or more techniques of this disclosure. In this example, the disclosure is directed to a video coding device, such as a video decoder 30. Video decoder 30 may be configured to determine whether a depth condition associated with the data is valid (210). When the depth condition is valid ("YES" of 210), video decoder 30 decodes a block of video data using at least one camera parameter (212). In some examples, video decoder 30 further generates a default disparity vector based on camera parameters (214). In some examples, video decoder 30 may further determine a disparity vector range from one or more elements signaled in a coded bitstream and generate a disparity vector using the disparity vector range. In some examples, video decoder 30 may perform at least one of depth-oriented neighboring block disparity vector (DoNBDV) prediction or view synthesis prediction. For example, after determining that the depth condition is valid, video decoder 30 may perform at least one of depth-oriented neighboring block disparity vector (DoNBDV) prediction or view synthesis prediction.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data associated with three-dimensional (3D) video that comprises at least one texture view and at least one depth view, the method comprising:
   receiving a first syntax element syntax element within a video parameter set (VPS) of a bitstream, wherein the bitstream includes a first block of video data and second block of video data;
   determining that a depth condition associated with the first block is valid, wherein determining that the depth condition associated with the first block is valid comprises determining that the first syntax element indicates that a set of scaling and offset camera parameters are present in the VPS of the bitstream for the first block, the set of scaling and offset camera parameters comprising a cp_scale parameter, a cp_off parameter, a cp_inv_scale_plus_scale parameter, and a cp_inv_off_plus_off parameter;
   based on the depth condition associated with the first block being valid, decoding the first block of video data using the cp_scale parameter, the cp_off parameter, the cp_inv_scale_plus_scale parameter, and the cp_inv_off_plus_off parameter;
   receiving a second syntax element within the VPS of the bitstream;
   determining that a depth condition associated with the second block is invalid, wherein determining that the depth condition associated with the second block is invalid comprises determining that the second syntax element indicates that the set of scaling and offset camera parameters are not present in the VPS of the bitstream for the second block; and
   based on the depth condition associated with the second block being invalid, decoding the second block of video data without using the cp_scale parameter, the cp_off parameter, the cp_inv_scale_plus_scale parameter, and the cp_inv_off_plus_off parameter.

2. The method of claim 1, further comprising:
   based on the received first syntax element indicating that the set of scaling and offset camera parameters are present, enabling one or more coding techniques for the first block that require the set of scaling and offset camera parameters for decoding at least one block of video data; and
   based on the received second syntax element indicating that the set of scaling and offset camera parameters are not present, disabling each coding technique for the second block that requires the set of scaling and offset camera parameters for decoding at least one block of video data.

3. The method of claim 1, wherein decoding the first block of video data using the set of scaling and offset camera parameters comprises:
   setting a depth value to be a value within a depth dynamic range; and
   converting the depth value to a disparity vector to be used for at least one coding technique that requires the set of scaling and offset camera parameters for decoding at least one block of video data.

4. The method of claim 1, further comprising:
checking a neighboring block for a disparity motion vector associated with the neighboring block; and
in response to determining that the neighboring block does not have a disparity motion vector:
based on the depth condition being valid, generating a default disparity vector based on the set of scaling and offset camera parameters; or
based on the depth condition not being valid, setting the default disparity vector to zero.

5. The method of claim 4, wherein the default disparity vector is used for inter-view motion prediction of blocks in the at least one depth view.

6. The method of claim 4, wherein the default disparity vector is used for inter-view motion prediction or inter-view residual prediction of blocks in the at least one texture view.

7. The method of claim 1, further comprising, after determining that the depth condition associated with the first block is valid, performing at least one of depth-oriented neighboring block disparity vector (DoNBDV) prediction or view synthesis prediction.

8. A device for decoding video data associated with three-dimensional (3D) video that comprises at least one texture view and at least one depth view, comprising:
a memory configured to store the video data; and
one or more processors in communication with the memory and configured to:
receive a first syntax element syntax element within a video parameter set (VPS) of a first bitstream, wherein the bitstream includes a first block of video data and a second block of video data;
determine that a depth condition associated with the first block is valid, wherein determining that the depth condition associated with the first block is valid comprises determining that the received first syntax element indicates that a set of scaling and offset camera parameters are present in the VPS of the bitstream for the first block, the set of scaling and offset camera parameters comprising a cp_scale parameter, a cp_off parameter, a cp_inv_scale_plus_scale parameter, and a cp_inv_off_plus_off parameter;
based on the depth condition associated with the first block being valid, decode the first block of video data using the cp_scale parameter, the cp_off parameter, the cp_inv_scale_plus_scale parameter, and the cp_inv_off_plus_off parameter;
receive a second syntax element within the VPS of the bitstream;
determine that a depth condition associated with the second block is invalid, wherein determining that the depth condition associated with the second block is invalid comprises determining that the second syntax element indicates that the set of scaling and offset camera parameters are not present in the VPS of the bitstream for the second block; and
based on the depth condition associated with the second block being invalid, decode the second block of video data without using the cp_scale parameter, the cp_off parameter, the cp_inv_scale_plus_scale parameter, and the cp_inv_off_plus_off parameter.

9. The device of claim 8, wherein the one or more processors are further configured to:
based on the received first syntax element indicating that the set of scaling and offset camera parameters are present, enable one or more coding techniques for the first block that require the set of scaling and offset camera parameters for decoding at least one block of video data; and
based on the received second syntax element indicating that the set of scaling and offset camera parameters are not present, disable each coding technique for the second block that requires the set of scaling and offset camera parameters for decoding at least one block of video data.

10. The device of claim 8, wherein decoding the first block of video data using the set of scaling and offset camera parameters comprises:
setting a depth value to be a value within a depth dynamic range; and
converting the depth value to a disparity vector to be used for at least one coding technique that requires the set of scaling and offset camera parameters for decoding at least one block of video data.

11. The device of claim 8, wherein the one or more processors are further configured to:
check a neighboring block for a disparity motion vector associated with the neighboring block; and
in response to determining that the neighboring block does not have a disparity motion vector:
based on the depth condition being valid, generate a default disparity vector based on the set of scaling and offset camera parameters; or
based on the depth condition not being valid, set the default disparity vector to zero.

12. The device of claim 11, wherein the default disparity vector is used for inter-view motion prediction of blocks in the at least one depth view.

13. The device of claim 11, wherein the default disparity vector is used for inter-view motion prediction or inter-view residual prediction of blocks in the at least one texture view.

14. The device of claim 8, wherein the one or more processors are further configured to:
after determining that the depth condition associated with the first block is valid, perform at least one of depth-oriented neighboring block disparity vector (DoNBDV) prediction or view synthesis prediction.

15. A method of encoding video data associated with three-dimensional (3D) video that comprises at least one texture view and at least one depth view, the method comprising:
determining that a depth condition associated with a first block of video data should be set to valid, wherein determining that the depth condition associated with the first block should be set to valid comprises determining that a set of scaling and offset camera parameters are present in a first portion of the 3D video, the set of scaling and offset camera parameters comprising a cp_scale parameter, a cp_off parameter, a cp_inv_scale_plus_scale parameter, and a cp_inv_off_plus_off parameter;
based on determining that the depth condition associated with the first block should be set to valid:
setting the depth condition associated with the first block to valid within a video parameter set (VPS) of a bitstream; and
encoding the first block of video data using the cp_scale parameter, the cp_off parameter, the cp_inv_scale_plus_scale parameter, and the cp_inv_off_plus_off parameter;
determining that a depth condition associated with a second block of video data should be set to invalid, wherein determining that the depth condition associated with the second block should be set to invalid comprises determining that the set of scaling and offset camera parameters are not present in a second portion of the 3D video; and based on determining that the depth condition associated with the second block should be set to invalid:
  setting the depth condition associated with the second block to be invalid within the VPS of the bitstream; and
  encoding the second block of video data without using the cp_scale parameter, the cp_off parameter, the cp_inv_scale_plus_scale parameter, and the cp_inv_off_plus_off parameter.

16. A device for encoding a block of video data associated with three-dimensional (3D) video that comprises at least one texture view and at least one depth view, comprising:
  a memory configured to store the block of video data; and
  one or more processors in communication with the memory and configured to:
    determine that a depth condition associated with a first block of video data should be set to valid, wherein determining that the depth condition associated with the first block should be set to valid comprises determining that a set of scaling and offset camera parameters are present in a first portion of the 3D video, the set of scaling and offset camera parameters comprising a cp_scale parameter, a cp_off parameter, a cp_inv_scale_plus_scale parameter, and a cp_inv_off_plus_off parameter;
    based on determining that the depth condition associated with the first block should be set to valid:
      set the depth condition associated with the first block to valid within a video parameter set (VPS) of a bitstream; and
      encode the first block of video data using the cp_scale parameter, the cp_off parameter, the cp_inv_scale_plus_scale parameter, and the cp_inv_off_plus_off parameter;
    determine that a depth condition associated with a second block of video data should be set to invalid, wherein determining that the depth condition associated with the second block should be set to invalid comprises determining that the set of scaling and offset camera parameters are not present in a second portion of the 3D video; and
    based on determining that the depth condition associated with the second block should be set to invalid:
      set the depth condition associated with the second block to be invalid within the VPS of the bitstream; and
      encode the second block of video data without using the cp_scale parameter, the cp_off parameter, the cp_inv_scale_plus_scale parameter, and the cp_inv_off_plus_off parameter.

17. The device of claim 16, wherein the one or more processors are further configured to:
  based on the received syntax element indicating that the set of scaling and offset camera parameters are present in the first portion of the 3D video, enable one or more coding techniques that require the set of scaling and offset camera parameters for encoding at least one block of video data; and
  based on the received syntax element indicating that the set of scaling and offset camera parameters are not present in the second portion of the 3D video, disable each coding technique that requires the set of scaling and offset camera parameters for encoding at least one block of video data.

18. The device of claim 16, wherein encoding the first block of video data using the set of scaling and offset camera parameters comprises:
  setting a depth value to be a value within a depth dynamic range; and
  converting the depth value to a disparity vector to be used for at least one coding technique that requires the set of scaling and offset camera parameters for encoding at least one block of video data.

19. The device of claim 16, wherein the one or more processors are further configured to:
  check a neighboring block for a disparity motion vector associated with the neighboring block; and
  in response to determining that the neighboring block does not have a disparity motion vector:
  based on determining that the depth condition should be set to valid, define a default disparity vector based on the set of scaling and offset camera parameters; or
  based on determining that the depth condition should not be set to valid, define the default disparity vector to be zero.

20. The device of claim 19, wherein the default disparity vector is used for inter-view motion prediction of blocks in the at least one depth view.

21. The device of claim 19, wherein the default disparity vector is used for inter-view motion prediction or inter-view residual prediction of blocks in the at least one texture view.

22. The device of claim 16, wherein the one or more processors are further configured to:
  after determining that the depth condition associated with the first block should be set to valid, perform at least one of depth-oriented neighboring block disparity vector (DoNBDV) prediction or view synthesis prediction.

* * * * *